United States Patent [19]
Anick et al.

[11] Patent Number: 5,175,814
[45] Date of Patent: Dec. 29, 1992

[54] DIRECT MANIPULATION INTERFACE FOR BOOLEAN INFORMATION RETRIEVAL

[75] Inventors: Peter G. Anick, Marlboro; Jeffrey D. Brennan, Allston; Rex A. Flynn, Belmont, all of Mass.; Bryan Alvey, Colorado Springs, Colo.; David R. Hanssen, Sterling, Mass.; Jeffrey M. Robbins, Colorado Springs, Colo.

[73] Assignee: Digital Equipment Corporation, Maynard, Mass.

[21] Appl. No.: 472,245

[22] Filed: Jan. 30, 1990

[51] Int. Cl.⁵ .......................................... G06F 15/20
[52] U.S. Cl. .................................................. 395/161
[58] Field of Search .............. 364/518, 521, 147, 188

[56] References Cited

U.S. PATENT DOCUMENTS

| | | | |
|---|---|---|---|
| 4,506,326 | 3/1985 | Shaw et al. | 364/900 |
| 4,608,649 | 8/1986 | Davis et al. | 364/491 |
| 4,674,042 | 6/1987 | Hernandez et al. | 364/521 X |
| 4,674,043 | 6/1987 | Hernandez et al. | 364/521 X |
| 4,716,541 | 12/1987 | Quatse | 364/900 |
| 4,769,772 | 9/1988 | Dwyer | 364/900 |
| 4,792,909 | 12/1988 | Serlet | 364/491 |
| 4,811,217 | 3/1989 | Tokizane et al. | 364/200 |
| 4,847,761 | 7/1989 | Ferriter et al. | 364/401 |

OTHER PUBLICATIONS

Meadow et al., "Online Access to Knowledge: System Design*," Journal of the American Society for Information Science, pp. 86-98, Mar. 1989.

Frei et al., "Graphical Presentation of Information and Services: A User-Oriented Interface," Swiss Federal Institute of Technology, Information Technology: Research and Development, 1983, pp. 23-42.

Lynch, "The User of Heuristics In User Interfaces for Online Information Retrieval Systems", University of California-Div. of Library Automation, Berkeley, Calif., American Society for Information Science, 1987, pp. 148-151.

Williams, "Indexing and Retrieval of Documents: Automated Techniques & Strategies", Digital Equipment Corp. Technical Reference (DEC-TR 561), Jul., 1988.

Debili et al., "About Reformulation in Full-Text IRS", Publication Date Unknown) pp. 344-357.

Fischer et al., "HELGON: Extending the Retrieval by Reformulation Paradigm", Proceedings of CHI '89 Conference, May, 1989, ACM Reference No. 0-897-91-301-9/89/0004-0357, pp. 357-362.

Spenke et al., "A Spreadsheet Interface for Logic Programming", Proceedings of CHI '89, May, 1989, ACM Reference No. 0-89791-301-9/89/0004-0775, pp. 75-80.

Thompson et al., "Support for Browsing in an Intelligent Text Retrieval System", Int. Journal of Man-Machine Studies, (1989) vol. 30, pp. 639-668.

Zloof, "Query-By-Example: A Data Base Language", IBM Systems Journal, No. 4, 1977, pp. 324-343.

McAlpine et al., "Integrated Information Retrieval in a Knowledge Worker Support System", Copyright 1989, ACM No. 0-89791-321-3/89/0006/0048.

Croft et al., "I³R: A New Approach to the Design of Document Retrieval Systems", Journal of the American Society for Information Science, Nov., 1987, pp. 389-404.

Salton, "Another Look at Automatic Text-Retrieval Systems", Communications of the ACM, vol. 29, No. 7, Jul., 1986, pp. 648-656.

(List continued on next page.)

Primary Examiner—Gary V. Markcom
Assistant Examiner—Mark K. Zimmerman
Attorney, Agent, or Firm—Ronald E. Myrick; Barry N. Young; Ronald C. Hudgens

[57] ABSTRACT

A method and apparatus that translates a natural language query into a Boolean expression to be used to search a database. The Boolean expression is displayed on a screen so that the user can alter the Boolean expression using a mouse or similar input device and re-execute the search. The manipulations performed by the user include moving terms of the query, changing the order in which query terms are evaluated, adding terms, deleting terms, and selecting alternate versions of terms.

37 Claims, 25 Drawing Sheets

OTHER PUBLICATIONS

Biswas et al., "Knowledge-Assisted Document Retrieval", Journal of the American Society for Information Science, Mar., 1987, pp. 83-110.

Duncan et al., "Intelligent Access to Databases Using a Thesaurus in Graphical Form", Proceedings of the 50th American Society for Information Science Annual Meeting, Boston, Mass., Oct. 4-8, 1987, vol. 24, pp. 377-387.

McMath et al., "A Graphical Thesaurus-Based Information Retrieval System", Int. Journal of Man-Machine Studies (1989) 31, pp. 121-147.

Croft et al., "An Expert Assistant for Document Retrieval", Department of Computer and Information Science, University of Massachusetts, COINS Technical Report 85-05.

"Metamorph, Knowledge Management Through Text Understanding", Sales Information from Thunderstone/Expansion Programs International, Inc., 1988.

Pincus et al., "Functionally Intelligent Interface: A Comprehensive Model of Human Cognition Incorporating Both Possiblistic and Probablistic Functioning", Proceedings of the Second Conference on Computer Interfaces and Intermediaries for Information Retrieval, Boston, Mass., May 28-31, 1986, pp. 113-121.

"Metamorph, Version 2.0, Description and Specifications", Copyright 1986, 1987 by Expansion Programs International, Inc.

Zubkoff, "A Technological Breakthrough", Defense Science, Apr. 1988, pp. 25-27.

Dudek, "PC Natural-Language Text Retrieval Package Brought Out by Thunderstone Software Corp.", Misweek, Monday, Jan. 5, 1987, p. 1.

FIG. 11

*(Figure rotated 90°; contents of the illustrated windows:)*

STARS: Query Reformulation Workspace

File  Terms  Help

| copy 469 | BACKUP saveset 313 | under | version 51 | tape 214 |

| cartridge | BACKUP saveset 15 | | version 5.1 119 | Magtape |

| | | | version 5 | TK50 tape cartridge |

[Apply Changes]  [Display Titles]

STARS

File  Databases  Maintenance  Customize  Searches

Query: copying backup savesets under version 5.1 tape

Query Matches: 5

Environment: Main  Databases Active: 3  Articles Available: 2696

[Apply Query]  [Display Titles]  [Clear Query]

Labels: 330, 840, 1126, 1124

1400 copying backup savesets under version 5.1

INPUT BUFFER

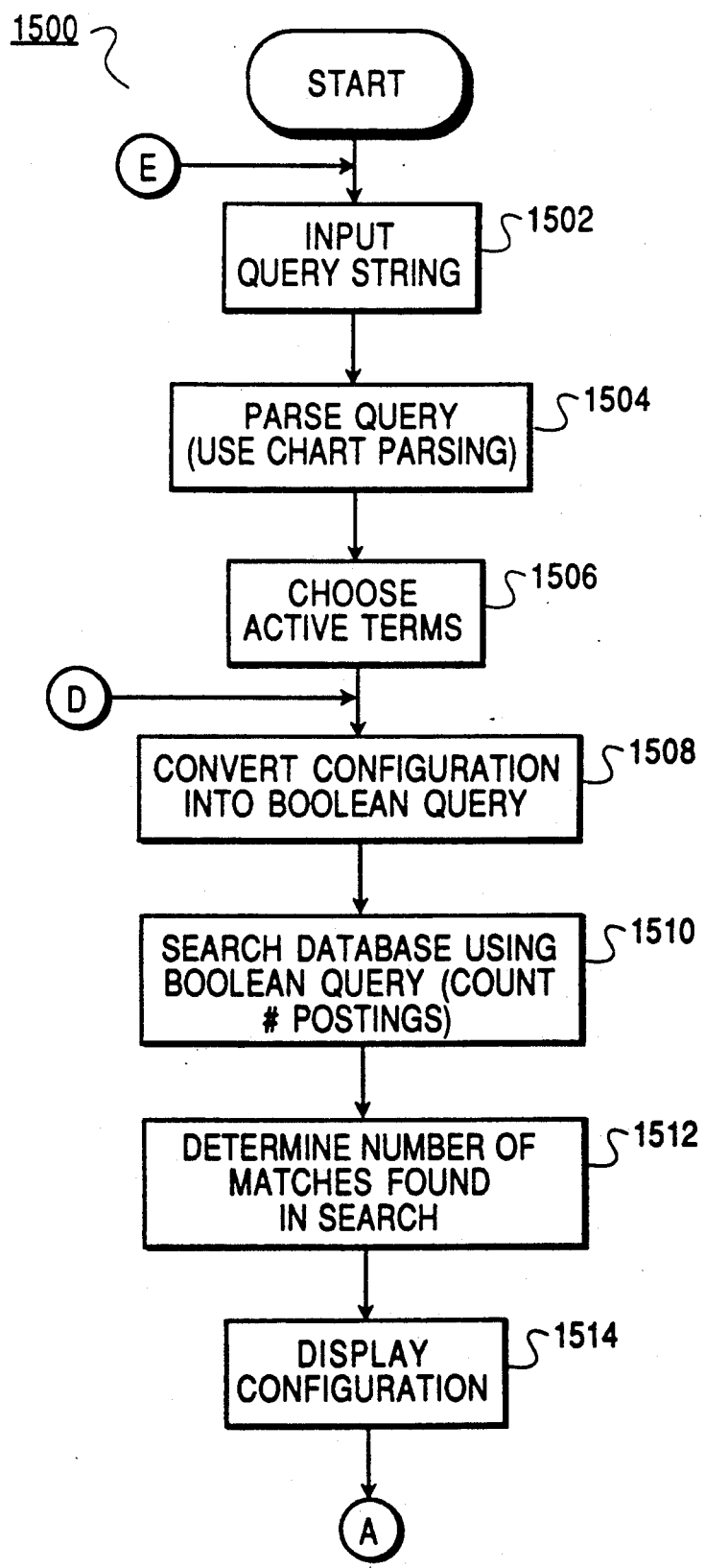

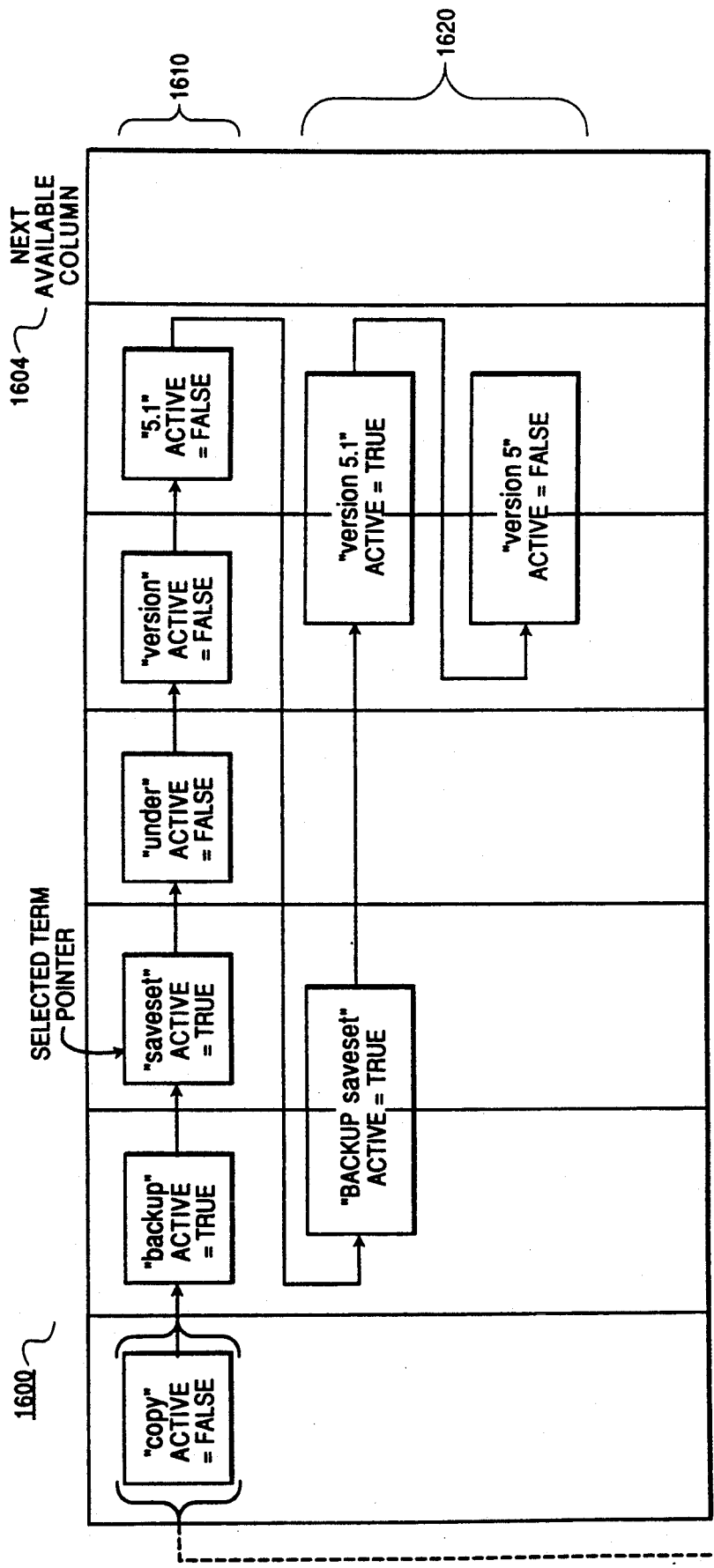
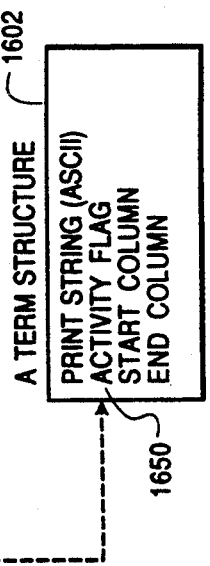
FIG. 16

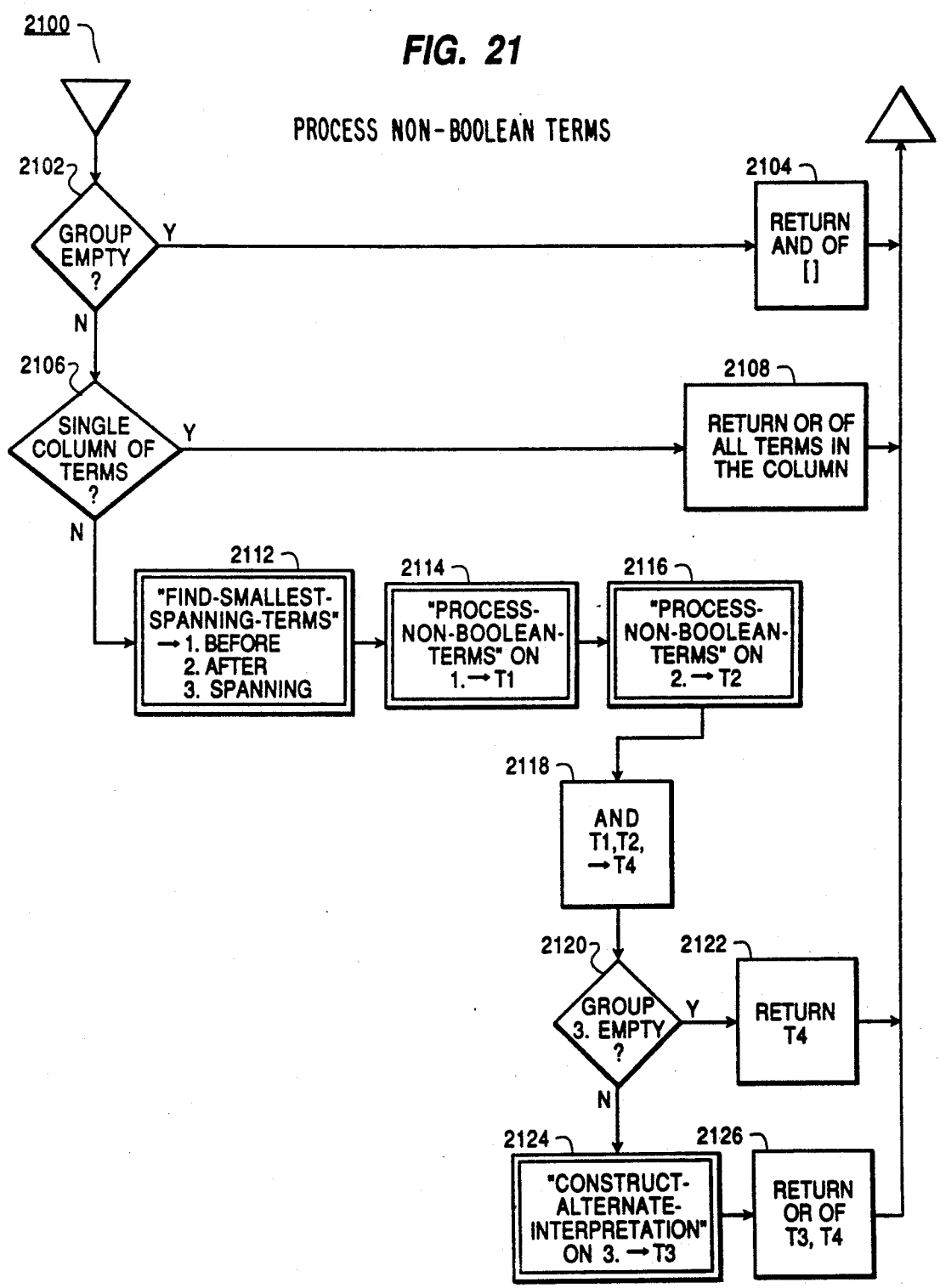

FIG. 23(a)
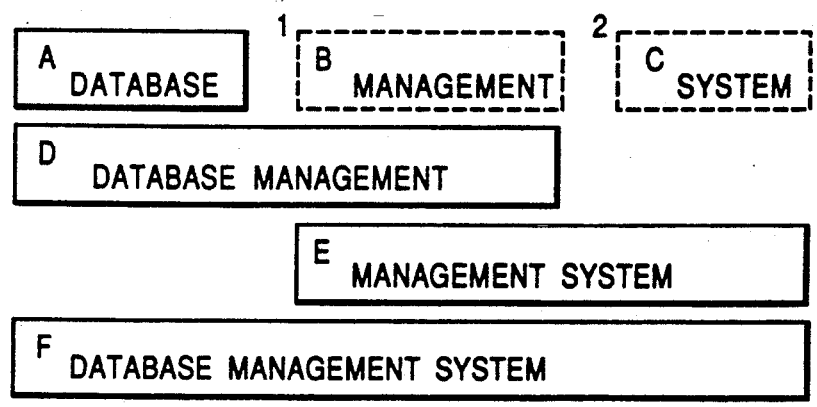
FIG. 23(b)
OR
↓
D
FIG. 23(c)
OR
↓
[ ]
FIG. 23(d)
OR
↓
F
FIG. 23(e)
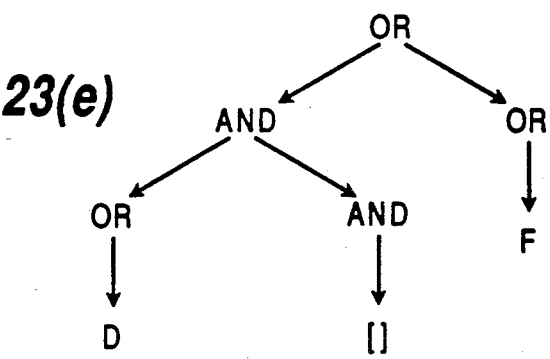

DIRECT MANIPULATION INTERFACE FOR BOOLEAN INFORMATION RETRIEVAL

BACKGROUND OF THE INVENTION

This application relates to database searches using Boolean queries and, more particularly, to a system allowing a user to examine and manipulate a Boolean query resulting from a natural language query.

Data processing systems are often used to search large collections of data known as databases. Such databases are stored, for example, on magnetic tape or disk and may be organized in many different ways. For example, some databases, known as structured databases, are organized into records, each record containing information elements or "attributes," such as a name, address, phone number, etc. In structured databases, each attribute has one of several possible values. For example, in a given record of the type discussed above, a "name" attribute may have a value of "Smith" and an "age" attribute may have a value of "32." An attribute value can also be "related" to other possible values of the attribute. For example, for the record with the "name" attribute having a value equaling the value "Smith," the value of the "age" attribute is also less than the value "1000."

Other databases, known as textual databases are designed to store and retrieve unstructured natural language texts, such as abstracts, mail messages, judicial opinions, or journal articles.

Commonly, a user accesses a textual database by typing a "Boolean query" having a format such as:

("COPYING" AND "BACKUP" AND
"SAVESET" AND ("V5.1" OR "V5")).

Such a query is called a Boolean query because the terms in the query are related by a Boolean relationship. Software connected with the database uses this Boolean query to search the database for all items in the database that satisfy (or "match") the query. In the above example, a database retrieval system performing a search on this query would return all articles containing all of the words "COPYING," "BACKUP," and "SAVESET," and either the word "V5.1" or the word "V5."

As the amount of storage capacity available for databases has increased, the method used to access a database and extract information has become increasingly, complex. The increasing complexity of a Boolean query often forces a user to reformulate the query before retrieving the desired information.

In addition, the greater accessibility of databases has meant that less sophisticated users are now seeking access to database information. To accommodate such users, software developers have generated user interfaces that attempt to shield the user from the complexities of formulating a Boolean query. Such systems allow a user to frame queries in a form more akin to English language statements. Systems currently in existence allow users to enter English-like queries, which are called "natural language queries." Such queries are automatically translated into Boolean queries by the system.

Although natural language queries allow unsophisticated users to access a database without having to formulate complex Boolean queries, problems sometimes arise when the system does not translate the natural language query into a useful Boolean query. Most natural language query systems are transparent to the user. A user inputs a natural language query, which the system uses to select items from the database. Because the user is unaware of the method used to convert the natural language query into a Boolean query, he does not always know whether conversion is performed correctly, completely, or adequately. In fact, the user of such systems is usually unaware of the Boolean query resulting from the original natural language query.

It would be desirable to allow a user to view how a data processing system has translated a natural language query into a Boolean query and to allow the user to reformat the Boolean query to reflect his true intentions. Such a system would still relieve the user from having to formulate a Boolean query "from scratch," and would allow the user to fine-tune a system-generated query.

It would also be desirable to display an automatically-generated Boolean query in a way that made its purpose intuitively obvious to even an unsophisticated user. Such a display might omit Boolean terms such as "AND," "OR," and "NOT" and, instead, indicate a relationship between the terms of the query graphically.

SUMMARY OF THE INVENTION

It is an object of the present invention to allow a user to view the result of a translation from a natural language query to a Boolean query.

It is a further object of the present invention to provide a way of displaying Boolean expressions that is intuitively understood by an unsophisticated user.

It is a further object of the present invention to allow a user to choose between ambiguous translations of natural language expressions.

It is a still further object of the present invention to allow a user to add additional terms to a Boolean query for incremental query reformulation.

It is a still further object of the present invention to allow a user to make use of existing on-line aids, such as a thesaurus, in reformulating a Boolean query.

The present invention overcomes the problems and disadvantages of the prior art and achieves the objects of the invention by graphically displaying a Boolean query generated by a data processing system from a query entered by the user, and by allowing the user to change the Boolean query by manipulating portions of the display.

In accordance with the purpose of the invention, as embodied and broadly described herein, the method of this invention relates to graphically displaying and manipulating a Boolean query stored in a memory of a data processing system, where the Boolean query includes a plurality of terms. The method includes the steps, performed by the data processing system, of: organizing the query as a plurality of active graphic display tiles, each active tile corresponding to a different term in the Boolean query; displaying the plurality of active tiles in a two-dimensional configuration that represents the Boolean query; receiving information representing changes to the two-dimensional configuration of the displayed active tiles, where the changes correspond to changes in the Boolean query; manipulating the two-dimensional configuration of the displayed active tiles in response to the received information to represent the corresponding changes to the Boolean query; and generating a new Boolean query in the memory of the data processor to reflect the manipulated configuration.

In accordance with the purpose of the invention, as embodied and broadly described herein, the method of this invention relates to automatically accessing a database using a Boolean query, the database including a plurality of elements stored in a data processing system. The method including the steps, performed by the data processing system, of: receiving a query string, the query string specifying desired elements of the database; reformulating the query string into a plurality of terms; displaying a plurality of active graphic display tiles, each of the tiles corresponding to a different term in the plurality of terms, in a two-dimensional configuration that represents the Boolean query, wherein tiles deemed active tiles correspond to terms of a Boolean query and tiles deemed inactive do not correspond to terms of the Boolean query; receiving information representing changes to the two-dimensional configuration of the displayed tiles; manipulating the two-dimensional configuration of the displayed tiles to represent changes to the Boolean query; and generating a new Boolean query in the memory of the data processor to reflect the manipulate configuration.

In further accordance with the purpose of the invention, as embodied and broadly described herein, the apparatus of this invention relates to an apparatus for graphically displaying and manipulating a Boolean query stored in a memory, the Boolean query including a plurality of terms. The apparatus comprises: means for organizing the query as a plurality of active graphic display tiles, each active tile corresponding to a different term in the Boolean query; means for displaying the plurality of active tiles in a two-dimensional configuration that represents the Boolean query; means for receiving information representing changes to the two-dimensional configuration of the displayed active tiles, said changes corresponding to changes in the Boolean query desired by a user; means for manipulating the two-dimensional configuration of the displayed active tiles in response to the received information to represent the corresponding changes to the Boolean query; and means for generating a new Boolean query in the memory of the data processor to reflect the manipulated configuration.

In further accordance with the purpose of the invention, as embodied and broadly described herein, the invention relates to an apparatus for graphically displaying and manipulating a Boolean query stored in a memory, the Boolean query including a plurality of terms. The apparatus comprises: means for receiving a query string, the query string specifying desired elements of the database; means for reformulating the query string into a plurality of terms; means for displaying a plurality of active graphic display tiles, each of the tiles corresponding to a different term in the plurality of terms, in a two-dimensional configuration that represents the Boolean query, wherein tiles deemed active tiles correspond to terms of a Boolean query and tiles deemed inactive do not correspond to terms of the Boolean query; means for receiving information representing changes to the two-dimensional configuration of the displayed tiles; means for manipulating the two-dimensional configuration of the displayed tiles to represent changes to the Boolean query; and means for generating a new Boolean query in the memory of the data processor to reflect the manipulated configuration.

Advantages of the invention will be set forth in part in the description which follows and, in part, will be obvious from the description or may be learned by practice of the invention. The advantages of the invention will be realized and attained by means of the elements and combinations particularly pointed out in the appended claims.

BRIEF DESCRIPTION OF THE DRAWINGS

The accompanying drawings, which are incorporated in and constitute a part of this specification, illustrate several embodiments of the invention and, together with the description, serve to explain the principles of the invention.

FIG. 11 is a representation of the screen display of FIG. 10 after a tile is moved;

FIG. 15 is a flowchart of a series of steps performed by the preferred method of the present invention to display a query;

FIG. 16 is a drawing of a preferred chart data structure used to create a display screen;

FIG. 18(*b*) is a flowchart showing additional ones of the series of steps of the flowchart of FIG. 18(*a*);

FIG. 21 is a flowchart of a further series of steps performed by a preferred method of the present invention to generate a Boolean query from the manipulate display;

Figure 20:
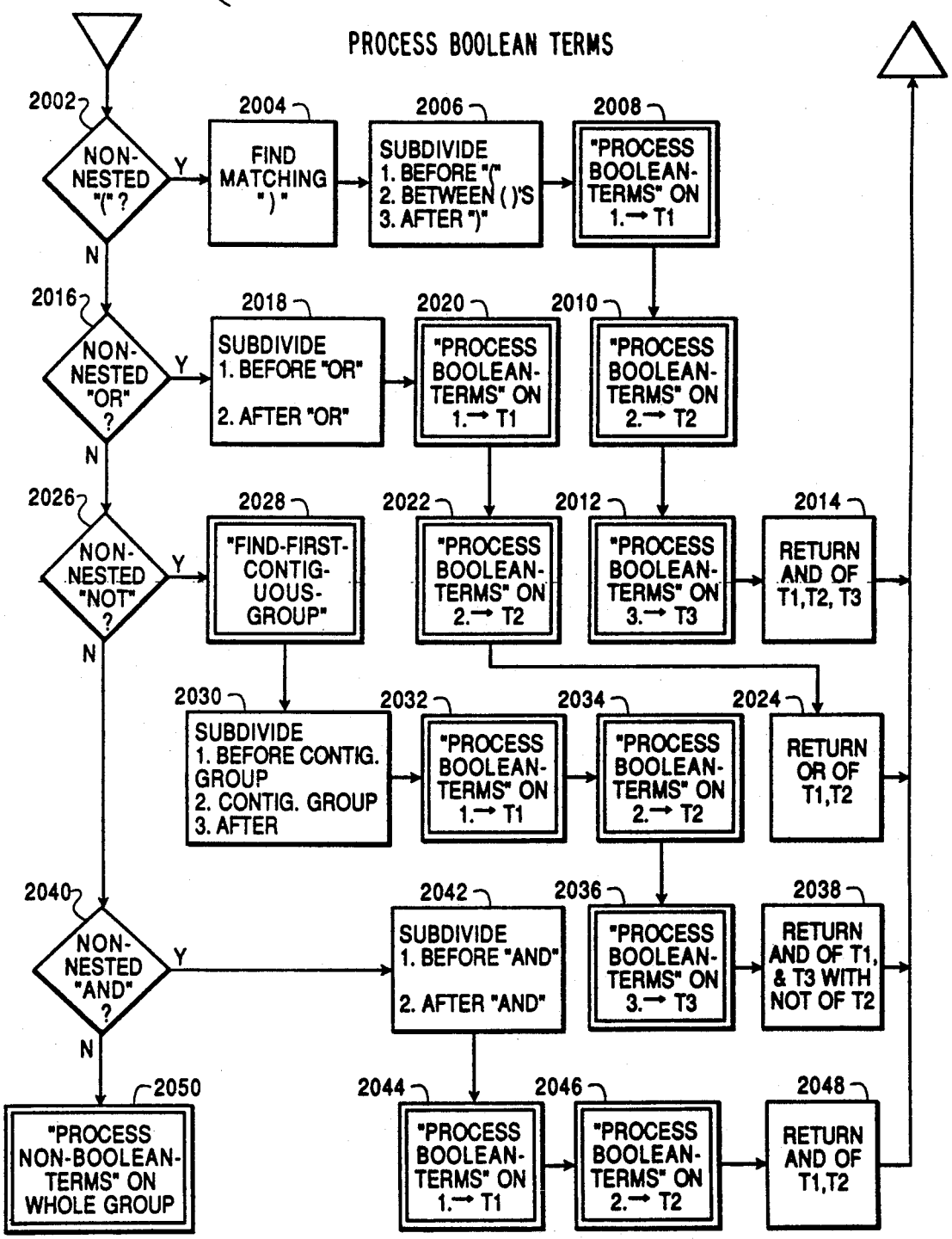
FIG. 20 is a flowchart of a series of steps performed by a preferred method of the present invention to generate a Boolean query from the manipulated display.
Figure 22A:
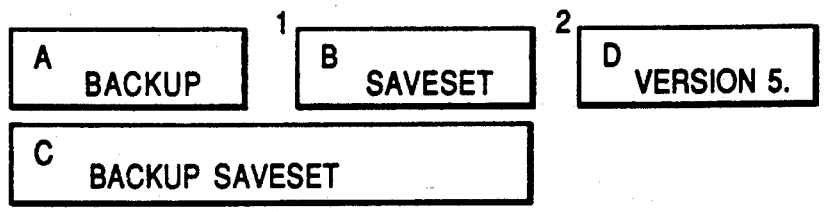
FIG. 22(a) shows an intermediate result of the method of FIGS. 20 and 21.
Figure 22B:
FIG. 22(b) shows an intermediate result of the method of FIGS. 20 and 21.
Figure 22C:
FIG. 22(c) shows an intermediate result of the method of FIGS. 20 and 21.
Figure 22D:
FIG. 22(d) shows an intermediate result of the method of FIGS. 20 and 21.
Figure 22E:
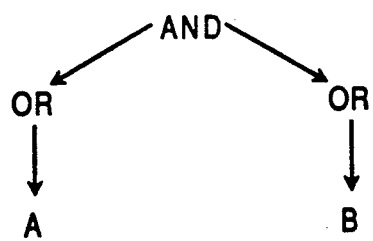
FIG. 22(e) shows an intermediate result of the method of FIGS. 20 and 21.
Figure 22F:
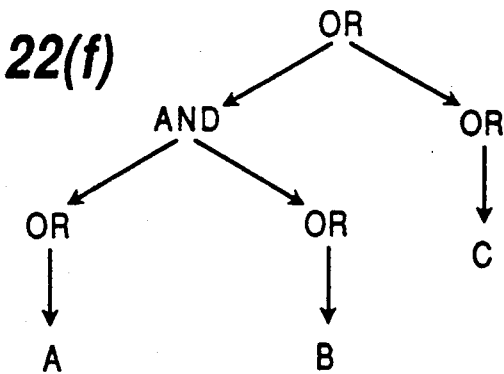
FIG. 22(f) shows an intermediate result of the method of FIGS. 20 and 21.
Figure 22G:
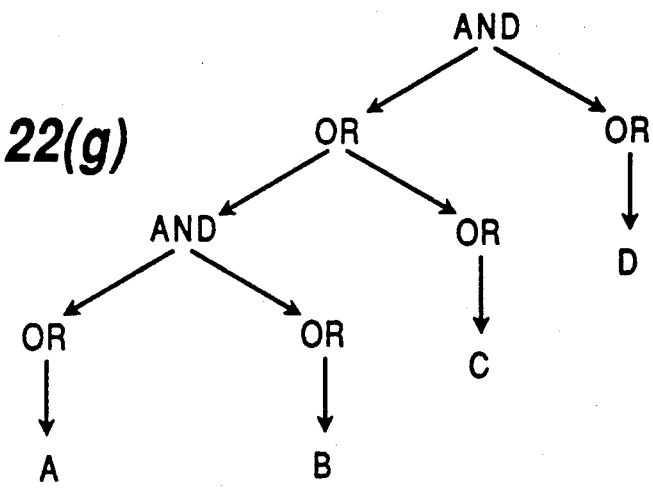
FIG. 22(g) shows an intermediate result of the method of FIGS. 20 and 21.
Figure 22H:
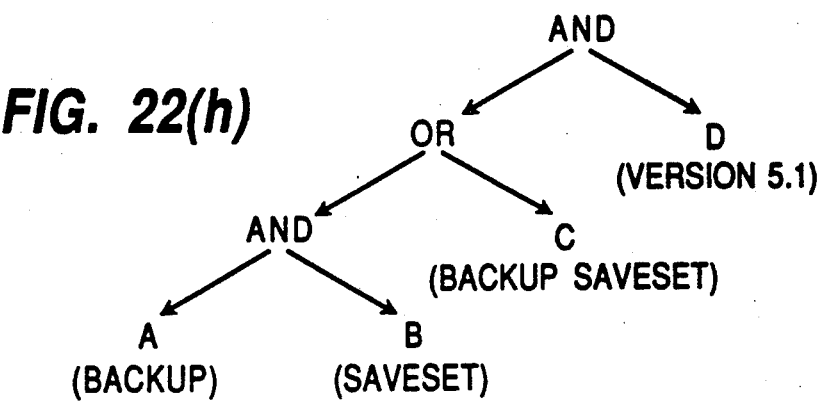

FIG. (h) shows a result of the method of FIGS. 20 and 21;

FIG. 23(a) shows an intermediate result of the method of FIGS. 20 and 21.

Figure 23F:
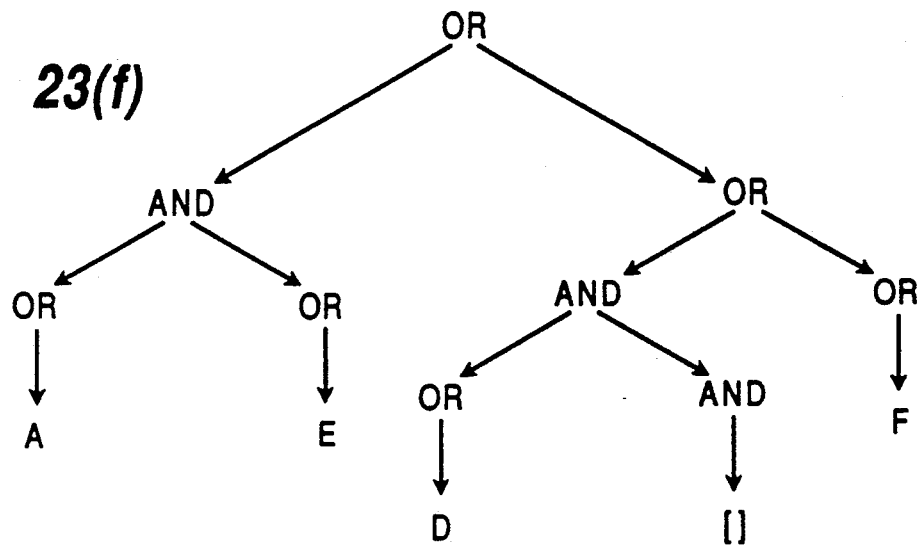
Figure 23G:
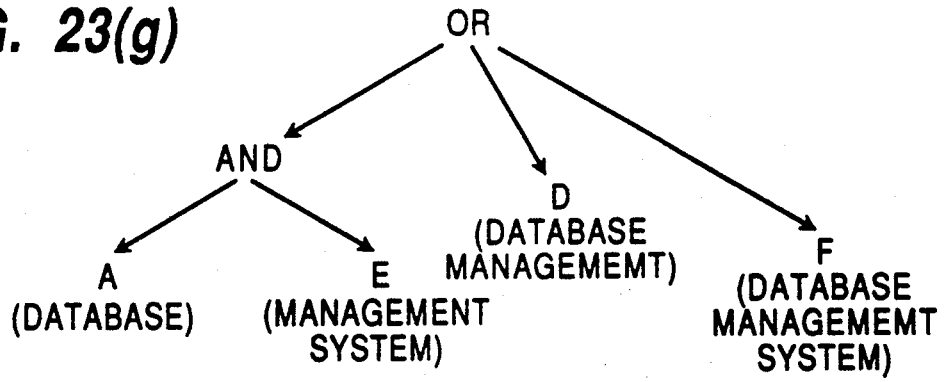

FIG. 23(b) shows an intermediate result of the method of FIGS. 20 and 21;

FIG. 23(c) shows an intermediate result of the method of FIGS. 20 and 21;

FIG. 23(d) shows an intermediate result of the method of FIGS. 20 and 21;

FIG. 23(e) shows an intermediate result of the method of FIGS. 20 and 21;

FIG. 23(f) shows an intermediate result of the method of FIGS. 20 and 21;

FIG. 23(g) shows a result of the method of FIGS. 20 and 21;

DETAILED DESCRIPTION OF THE PREFERRED EMBODIMENTS

Reference will now be made in detail to the present preferred embodiments of the invention, examples of which are illustrated in the accompanying drawings. Wherever possible, the same reference numbers will be used throughout the drawings to refer to the same or like parts.

I. Background and Overview

The present invention is preferably embodied in a software program residing on a VAX data processing system operating under the VMS operating system, both of which are manufactured by Digital Equipment Corporation. In a preferred embodiment, the software program is written in the C++ and BLISS-32 programming languages and uses the VAX Rdb/VMS relational database management system, which also is manufactured by Digital Equipment Corporation. A windowing scheme is implemented using DECwindows, which is a proprietary product of Digital Equipment Corporation, and which is based on the X Window System, a shareware program developed by Robert W. Scheifler of the MIT Laboratory for Computer Science, Jim Gettys of Digital Equipment Corporation, and Ron Newman of MIT/Project Athena. "DECwindows," "VAX," "VMS," and "Rdb/VMS" are trademarks of Digital Equipment Corporation.

According to the present invention, the data processing system receives a query, such as a natural language query, from a user and displays the terms of the query on a display screen. Each term is preferably displayed surrounded by a box. A displayed term and its surrounding box is called a "tile," although the term "tile" should not be limited only to the use of a box surrounding a term. Instead, a "tile" refers more generally to a graphical representation corresponding to a displayed query term.

Alternative ways of representing a term are preferably displayed as tiles directly below that term. As a general rule, in a preferred embodiment of the invention, tiles corresponding to terms that are to be ANDed together in the Boolean query are displayed in a left to right manner, while tiles corresponding to terms that are to be ORed together in the Boolean query are displayed so that they overlap in a vertical direction. As will be explained below, this general statement has been somewhat simplified, but represents the general theory of the graphics display. A software program in accordance with the present invention translates the received query into a Boolean query. Preferably, the software program then highlights those displayed tiles that the program considers part of the Boolean query. The highlighted tiles are referred to as "active" tiles and the non-highlighted tiles are referred to as "inactive" tiles. This is demonstrated in the accompanying figures.

After the Boolean translation of the received query is displayed, the user preferably can alter the Boolean query by manipulating the displayed tiles using a familiar input device, such as a mouse. Thus, while the user is spared the task of creating a Boolean query, he is able to see a Boolean query created by the system in an easily understood graphical form and to manipulate the graphical form to affect subsequent versions of the Boolean query.

Figure 1:
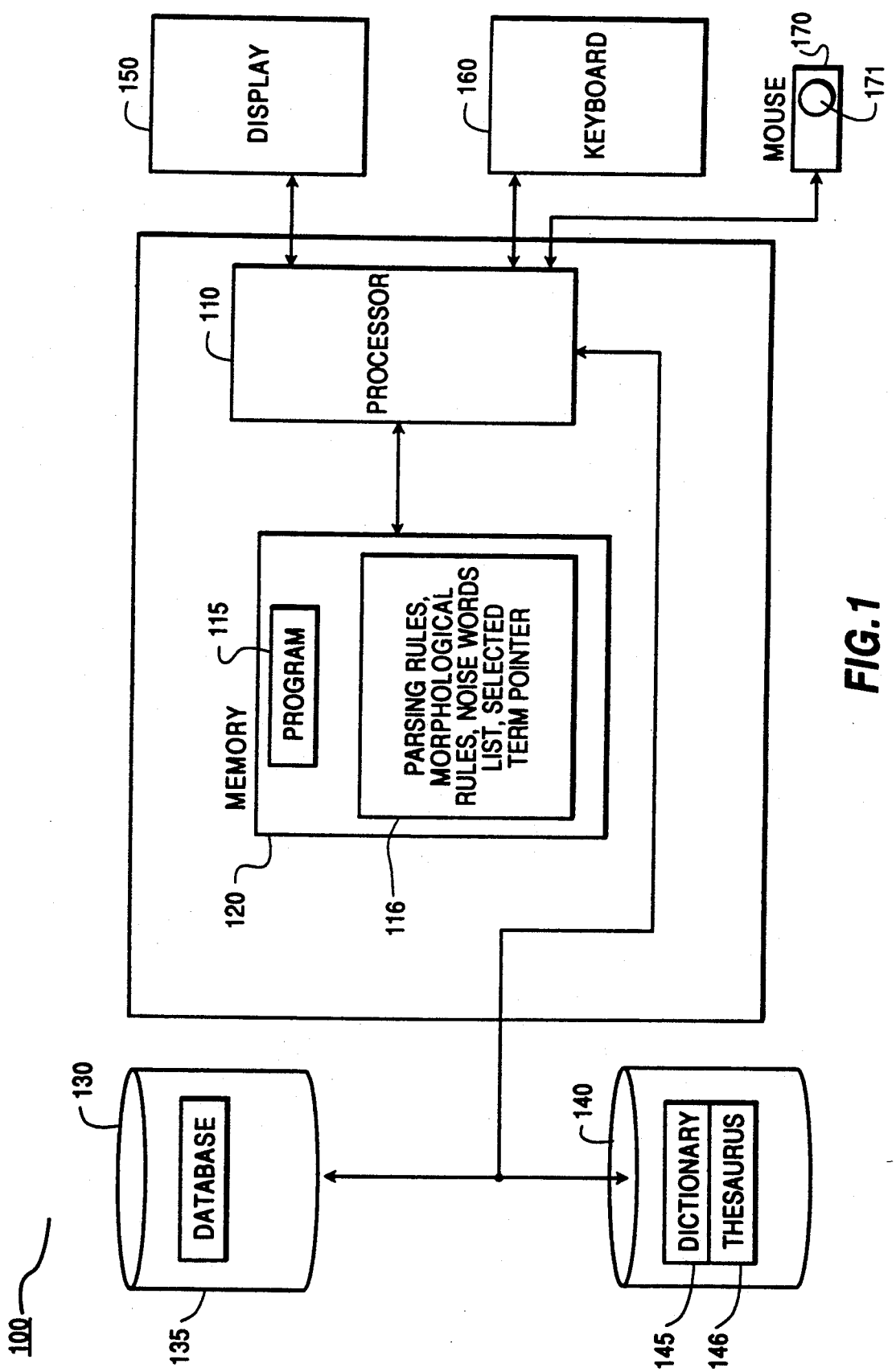
FIG. 1 is a block diagram of a data processor system on which the present invention is implemented.

FIG. 1 is a block diagram of a data processing system 100 on which a preferred embodiment of the present invention is implemented. Data processing system 100 includes a processor 110 and a memory 120. Memory 120 stores data such as the program 115 performed by processor 110 to implement the present invention, morphological rules and parse rules described below, a selected terms pointer and a list of "noise words" also described below. Data processing system 100 also preferably includes a database 135 stored in an auxiliary memory 130 that is to be searched using a Boolean query generated according to the present invention. Memory 130 is preferably an external hard disk drive, but could also be a CD ROM device or similar device.

Data processing system 100 also preferably includes a dictionary 145 and a thesaurus 146 stored in another auxiliary memory 140, which is preferably an external hard disk drive, but could also be an external CD ROM or similar device. Dictionary 145 contains a list of words that can be used as terms in the Boolean query and identifies the part of speech for each of the words. The words are stored in dictionary 145 in "citation form," which is a morphologically uninflected form that is related to a number of variations of the term. For example, the term "copy" is preferably stored in dictionary 145 and identified as either a verb or a noun. The memory 120 includes morphological rules to change words such as "copied," "copies," and "copying" to their citation form of "copy" before they are looked up in dictionary 145. Similarly, certain query terms using lower case letters are stored in dictionary 145 with a citation form having all capital letters. Thus, "sql" would be stored as "SQL." The system maintains a list of morphological rules for shortening words to their citation forms in memory 116 and a list of parse rules for syntactic analysis in memory 116.

Thesaurus 146 stores lists of words related to citation terms. The related words preferably include more specialized/more general words, lists of synonyms, and lists of related terms. The exact organization of both dictionary 145 and thesaurus 146 is not important to the present invention. Any organization that will accommodate the below-described steps may be used.

In addition, data processing system 100 preferably includes a display 150, which can be any device for displaying information in a graphical form, a keyboard 160, which can be any device for inputting characters, and a mouse 170 with a button 171, which can be any device for indicating screen position.

II. Screen Displays

The present invention is designed to be very interactive with users. Thus, when processor 110 executes program 115, a series of screens are displayed on display 150. These screens may be changed by input from keyboard 160 and mouse 170. Prior to explaining a preferred implementation of the method of this invention, an exemplary series of display screens will be explained to demonstrate how this invention may be used to achieve its objects.

A. Initial Screen Display

Figure 2:
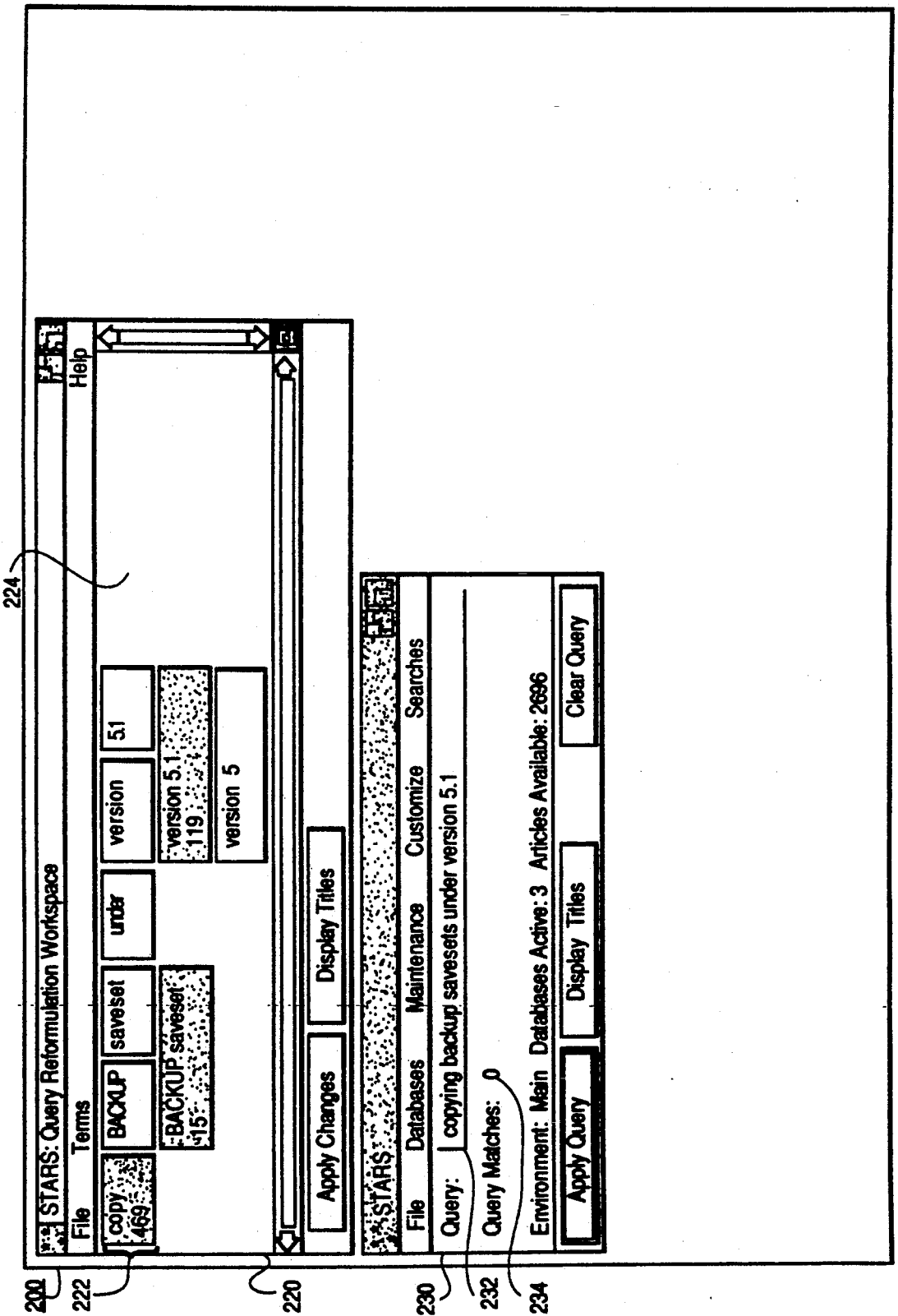
FIG. 2 is a preferred representation of a screen display showing a query string and displayed tiles corresponding to terms of the query string.

FIG. 2 is a preferred representation of a screen display 200 showing a query string and displayed tiles corresponding to terms of the query string. The present invention uses a mouse-driven windowing scheme well-known to persons of ordinary skill in the art, although such a windowing scheme is not a requirement of the present invention. Any suitable graphical user interface may be used.

In a preferred embodiment, the windowing scheme is implemented using DECwindows, as described above. The following discussion will assume familiarity with mouse-driven windowing schemes in general, and with terms such as "double click," "single click,"."click and drag," and "pull-down window," which are understood by persons familiar with such systems. The implementation details of such systems will not be discussed.

FIG. 2 shows a first window 230 and a query reformulation window 220. First window 230 includes a query entry area 232, which is used to display a query string entered by the user on keyboard 160. In FIG. 2, the user has entered the query string "copying backup savesets under version 5.1." This query string is an example of a natural language query indicating that the user wishes to retrieve from database 135 all items discussing the topic of copying "backup savesets" under version 5.1 of the VMS operating system.

In the example of FIG. 2, processor 110 has translated the query string into a Boolean query and has searched the data base using that query. In the example, no matching items were found in the database, as indicated by, the numeral "0" in a Query Matches field 234. First window 230 also includes various activable "buttons" such as "Apply Query" and "Clear Query," which will be discussed below.

Query reformulation window 220 includes tiles corresponding to each term in a query entry, area 232 on a first display line 222 of tile display area 227, although some query terms, such as "backup" are changed into their citation form. Display area 224 includes a number of columns into which the tiles are organized. The width cf each column is defined by the width of the widest tile in that column. For example, the first column is narrower than the second column because the term "copy" has fewer letters than the term "BACKUP." The number of times each term was found in a most recent search of database 135 is displayed in the lower leftmost corner of each tile.

As explained above, not every tile on first display line 222 exactly matches the terms of the input query string. For example, the system has displayed the term "copying" from the query string as the citation form "copy." As explained above, a citation form is a canonical form of a term. In addition, the system has displayed the term "savesets" from the query string in its citation form "saveset." The system has also displayed the term "backup" from the query string as "BACKUP," because "backup" is stored in dictionary 145 in all capital letters.

Additional tiles representing alternative terms to the terms of the query string are preferably displayed below the tiles representing terms of the query string. For example, in FIG. 2, the terms "BACKUP" and "saveset" have been recognized by the system as a phrase. A single tile corresponding to the term "BACKUP saveset" and occupying the same columns as the tiles "BACKUP" and "saveset" is an alternative to those terms and has been displayed.

Similarly, the present invention has recognized that "version" and "5.1" also may be stated as the canonical expression "version 5.1," and a tile corresponding to a term "version 5.1" has been displayed to occupy the same columns as the tiles corresponding to "version" and "5.1." Lastly, the present invention has recognized that "version 5" is a more generalized term for the term "version 5.1." Thus, a tile corresponding to the term "version 5" has been displayed to occupy the same columns as the tile corresponding to "version 5.1."

Query reformulation window 220 includes highlighted tiles and non-highlighted tiles. In FIG. 2, highlighted tiles are displayed as dark tiles, called "active tiles," and correspond to terms included in the Boolean query. Non-highlighted tiles are displayed as light tiles, called "inactive tiles," and correspond to terms not included in the Boolean query. Thus, in the example of FIG. 2, the query string "copying backup savesets under version 5.1" has been translated to the Boolean query:

"copy" AND "BACKUP saveset" AND "version 5.1."

In FIG. 2, the Boolean term AND is not explicitly displayed, but is implied by the placement of the tiles on the display. Tiles which occupy at least one common column in a vertical direction are said to "overlap." Tiles which overlap correspond to terms which are ORed together in the Boolean query. Tiles which do not overlap correspond to terms which are ANDed together in the Boolean query. Some special cases exist which will be discussed below. It should be understood that, in this discussion and all following discussions, the words "vertical" and "horizontal" as well as the words "rows and columns" may be reversed without affecting the scope of the present invention.

In FIG. 2, when the query string was translated to the Boolean query, the term "under" was found in the list of "noise words" in memory 116, i.e., the term "under"

was considered to be a word having little value in formulating the Boolean query, and was not included in the Boolean query. Thus, the tile corresponding to the term "under" is not active in FIG. 2. Other examples of noise words include "a," "the," "on," "of," and so forth.

Similarly, when the query string was translated, the system included the phrase "BACKUP saveset" in the Boolean query instead of including the two separate terms "BACKUP" and "saveset" and further chose to use the term "version 5.1" instead of the terms "version" and "5.1" or the term "version 5" because of morphological rules in memory 116.

B. Changing a Tile's "Activity"

Figure 3:
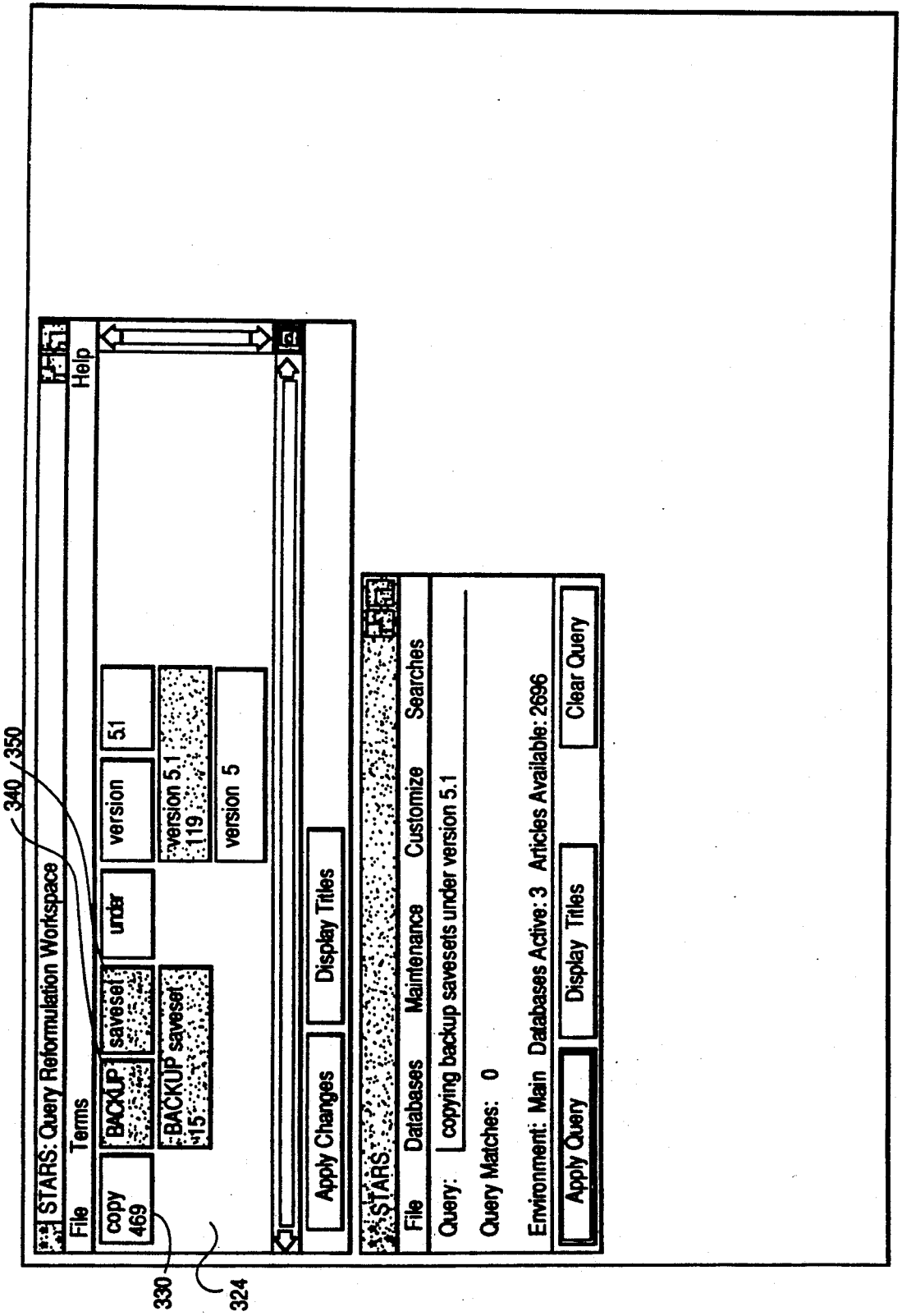
FIG. 3 is a representation of a screen display showing the screen display of FIG. 2 after one tile has been deactivated and two tiles have been activated.

In the present invention, the user may change active tiles to inactive tiles and may change inactive tiles to active tiles, thus changing the terms included in the Boolean query. FIG. 3 includes a representation of a screen display area 324 showing the screen display area 224 of FIG. 2 after one tile 330 has been deactivated and two tiles 340 and 350 have been activated.

The preferred method of activating and deactivating a tile involves double clicking a button on mouse 170. In the deactivation of tile 330, the user would first move a cursor to tile 330. By double clicking the mouse button on an active tile, such as the "copy" tile, that tile is changed to an inactive tile. By rendering tile 330 inactive, the term "copy" is no longer included in the Boolean query.

The preferred method changing a tile from inactive to active involves the same step. If a user had screen display 224 and moved the cursor to each of the "BACKUP" and "saveset" tiles 340 and 350, respectively, in FIG. 3 with mouse 170, and double clicked the button on mouse 170, the double clicking operation causes the formerly inactive tiles 340 and 350 to become active tiles. Making tiles 340 and 350 active causes the terms "BACKUP" and "saveset" to be included in the Boolean query. Thus, the Boolean query represented by FIG. 3 is:

(("BACKUP" AND "saveset") OR "BACKUP saveset") AND "version 5.1."

C. Adding a Tile

Figure 4:
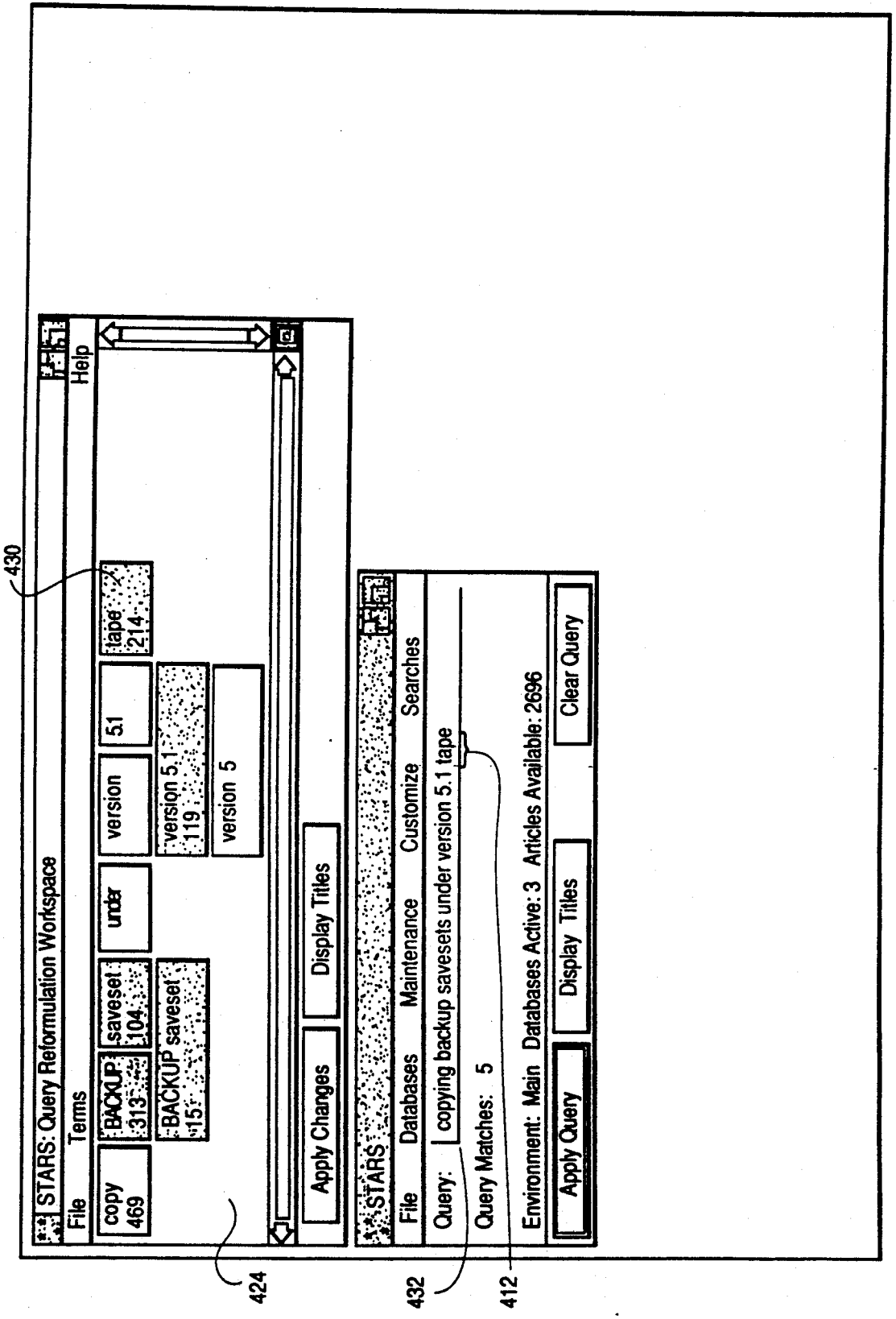
FIG. 4 is a representation of the screen display of FIG. 3, showing an additional query string and addition of a new tile corresponding to the additional query string.

Sometimes, a user may forget to add a term to his initial query string or wish to add a term to narrow the search. The preferable method of adding a tile may be seen using FIG. 4. FIG. 4 includes a representation of a screen display area 424 showing an additional query string 412 and addition of a new tile corresponding to the additional query string to the screen display of FIG. 3. To add tile 430, the user would move the cursor to area 412 using mouse 170 and would enter the additional query string "tape" in area 432 using keyboard 160. In the example, the additional query string "tape" only contains one term. Other additional query strings may contain more than one term.

When the user presses the "RETURN" key, on keyboard 160, a tile 430 corresponding to the term or terms of the additional query string is added to display area 424, along with any alternative tiles generated by the system. Thus, in FIG. 4, tile 430 corresponding to the term "tape" is added to the display. A new term is generally added at the first available column of the display. Thus, the Boolean query represented by the display of FIG. 4 is:

(("BACKUP" AND "saveset") OR "BACKUP saveset") AND "version 5.1" AND "tape."

D. Selecting a Tile

Figure 5:
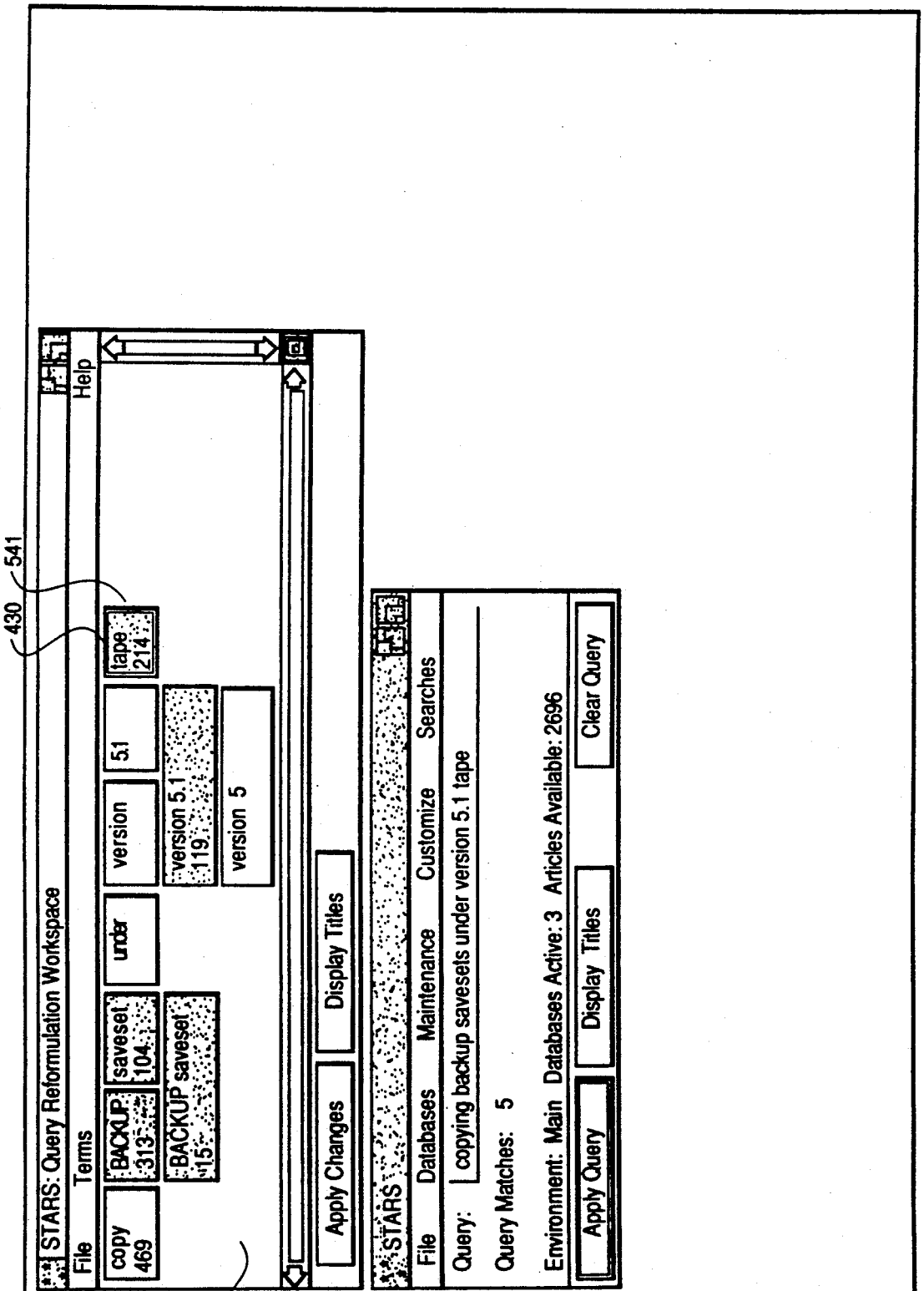
FIG. 5 is a representation of the screen display of FIG. 4, showing selection of the new tile.

FIG. 5 includes a representation of a screen display area 524 showing selection of new tile 430 of FIG. 4. If a user has moved a cursor to the "tape" tile 430 and "single clicked" the button on mouse 170, a double box graphic 541 will be displayed around the "tape" tile 430, and "tape" tile 430 is now "selected." Reasons for selecting tiles will be discussed below.

E. Opening the TERMS Window

Figure 6:
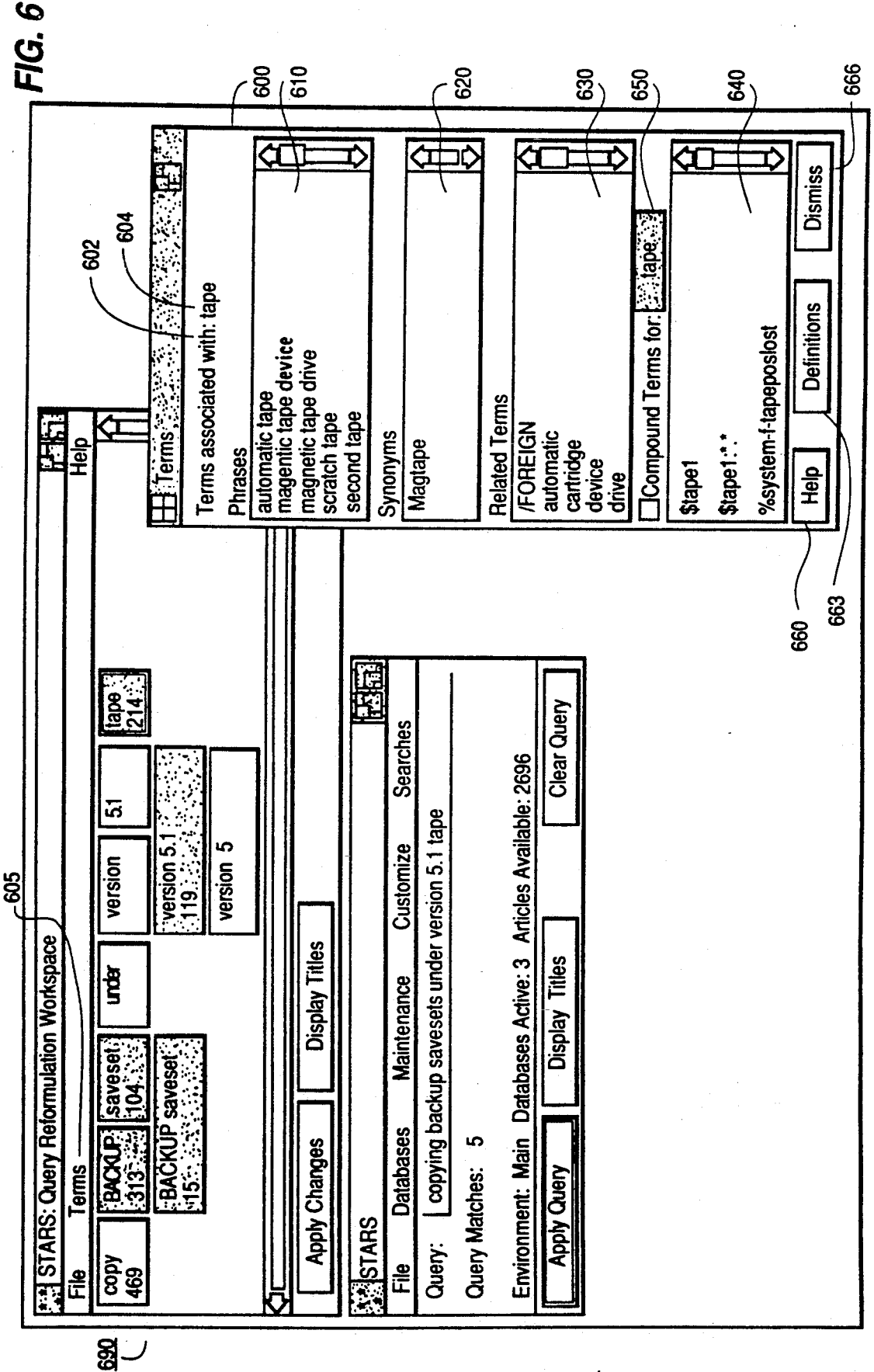
FIG. 6 is a representation of the screen display of FIG. 5, showing a newly-opened window.

As alluded to above, it is often desirable for the user to access on-line aids, such as dictionary 145 and thesaurus 146. FIG. 6 is a representation of a screen display 690 showing a newly-opened window 600 that allows such access. Window 600 called a TERMS window. TERMS window 600 was opened, i.e., displayed and made active by "pulling down" the TERMS menu header 605 of query reformulation window 220 and clicking on a menu item "TERMS" (not shown). The "pulling down and clicking" operation is well-known to persons of ordinary skill in the art. TERMS window 600 is exemplary only and does not limit the type of windows that may be used in other embodiments.

Preferably, TERMS window 600 has the following format. The standard phrase "Terms associated with:" 602 is followed by the name 604 of the currently selected tile. In the example, the currently selected tile is the "tape" tile, so the word "tape" is displayed. Display of the selected tile reminds the user that the data displayed in each of the subwindows 610, 620, 630, and 640 relates to the selected tile.

In FIG. 6, TERMS window 600 has four subwindows: a Phrases subwindow 610, a Synonyms subwindow 620, a Related Terms subwindow 630, and a Compound Terms subwindow 640. Each of these subwindows contains terms related either conceptually or linguistically to the term corresponding to the selected tile. The Phrases subwindow 610 contains a list of terms that are phrases (multiple word terms) incorporating the term corresponding to the selected tile. For example, in FIG. 6, the Phrases subwindow 610 contains the terms "automatic tape," "magnetic tape device," "magnetic tape drive," "scratch tape," and "TK50 tape cartridge." Each of these terms is a multiple word term including the term "tape."

Similarly, the Synonym subwindow 620 of FIG. 6 contains the term "Magtape." This term is a synonym for the term "tape."

The Related Terms subwindow 630 contains the terms "/FOREIGN," "automatic," "cartridge," "device," and "drive." All these terms are somehow related in concept to the term "tape."

The Compound Terms subwindow 640 contains the terms "$tapel," "$tapel*.*," and "%system-f-tapeoslost." Each of these terms is a term containing both alphabetic and nonalphabetic symbols that also contains the substring "tape." The Compound Terms subwindow 640 operates somewhat differently from the other subwindows, in that it also includes a user entry area 650. Initially, user entry area 650 contains the term corresponding to the selected tile, as shown in FIG. 6. If the user so desires, however, he can select a portion of the term displayed in user entry area 650. For example, the user may, through use of mouse 170, select "tape" from "tape." Such a change would cause compound terms related to "ape" to appear in the Compound Terms subwindow 640. Thus, the user may display compound terms that are related to a substring of the term corresponding to the selected tile. Such a capability may be useful when the selected term is long or complex. A user entry area may also be used with other subwindows in a similar manner.

If a different tile than "tape" was selected when the TERMS window was opened, the TERMS window would still have the same format as shown in FIG. 6, but the terms in each of the subwindows would change, depending on the selected tile. It will be understood that the subwindows discussed herein are selected as exemplary and not limiting.

TERMS window 600 preferably contains various graphics items, such as slider bars and sizing icons that are not relevant to the present invention and will not be described in detail herein. TERMS window 600 also preferably contains three graphics "buttons": a "Help" button 660, a "Definitions" button 663, and a "Dismiss" button 666. Clicking on "Help" button 660 causes a help window to be displayed. Clicking on "Definitions" button 663 causes a window containing a definition of one or more of the terms in the subwindows to be displayed. Clicking on "Dismiss" button 666 causes TERMS window 600 to be closed, i.e., to cease to be displayed.

F. Adding Synonyms to the Display Using the Terms Window

Figure 7:
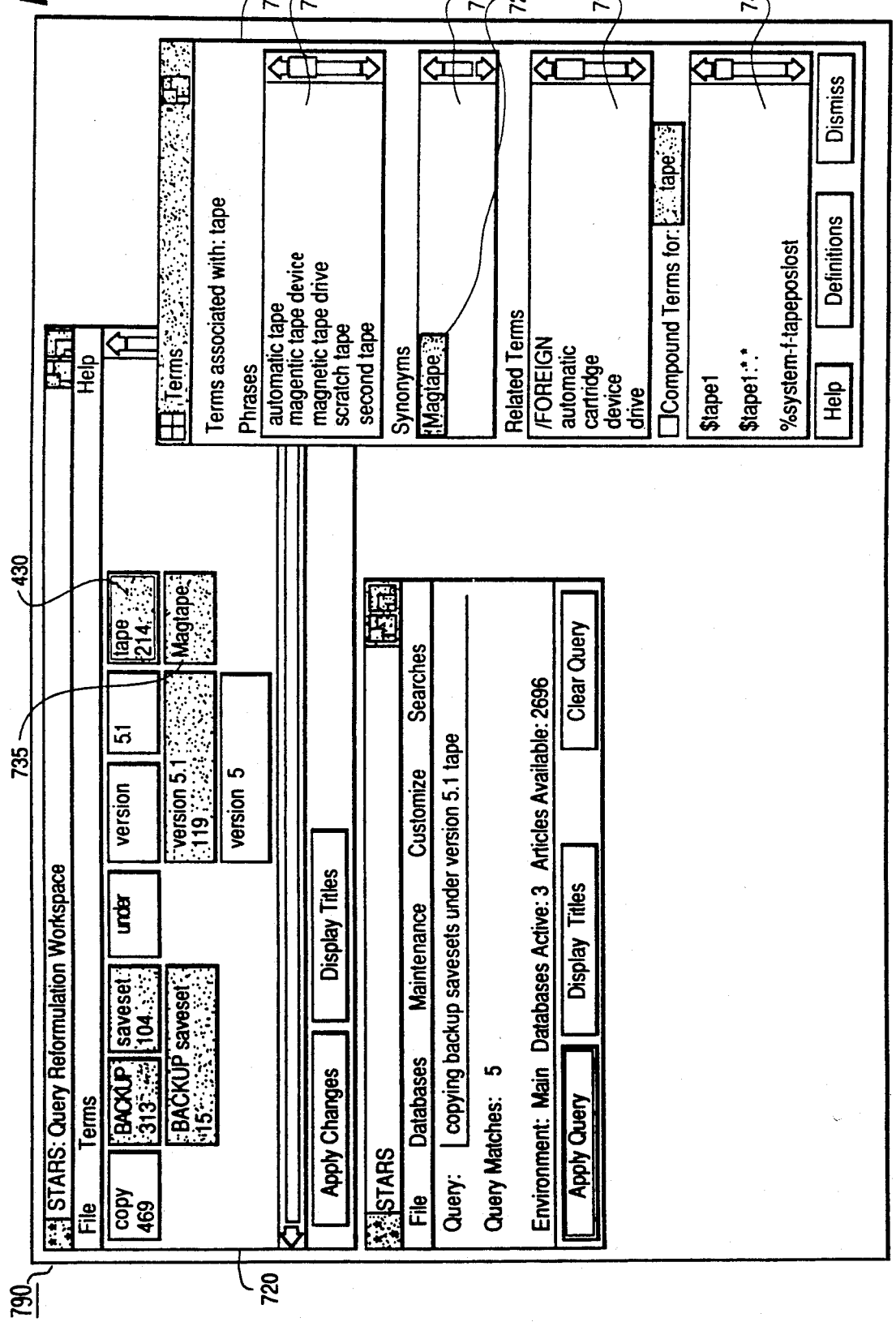
FIG. 7 is a representation of the screen display of FIG. 6, showing use of the newly-opened window to add a new synonym tile.

FIG. 7 is a representation of a screen display 740 showing use of TERMS window 700 to add a new tile containing a synonym for "tape." As shown by highlighting, the user has double clicked on the term "Magtape" 725 in the Synonym subwindow 720. This action causes a new "Magtape" tile 735 to be added to query reformulation window 720 in the same column as the "tape" tile 430. New "Magtape" tile 735 is active, indicating that the database should be searched for either "tape" or "Magtape." Thus, the Boolean query represented by FIG. 7 would now be:

(("BACKUP" AND "saveset") OR "BACKUP saveset") AND "version 5.1" AND ("tape" OR "Magtape").

G. Adding Related Terms to the Display Using the TERMS Window

Figure 8:
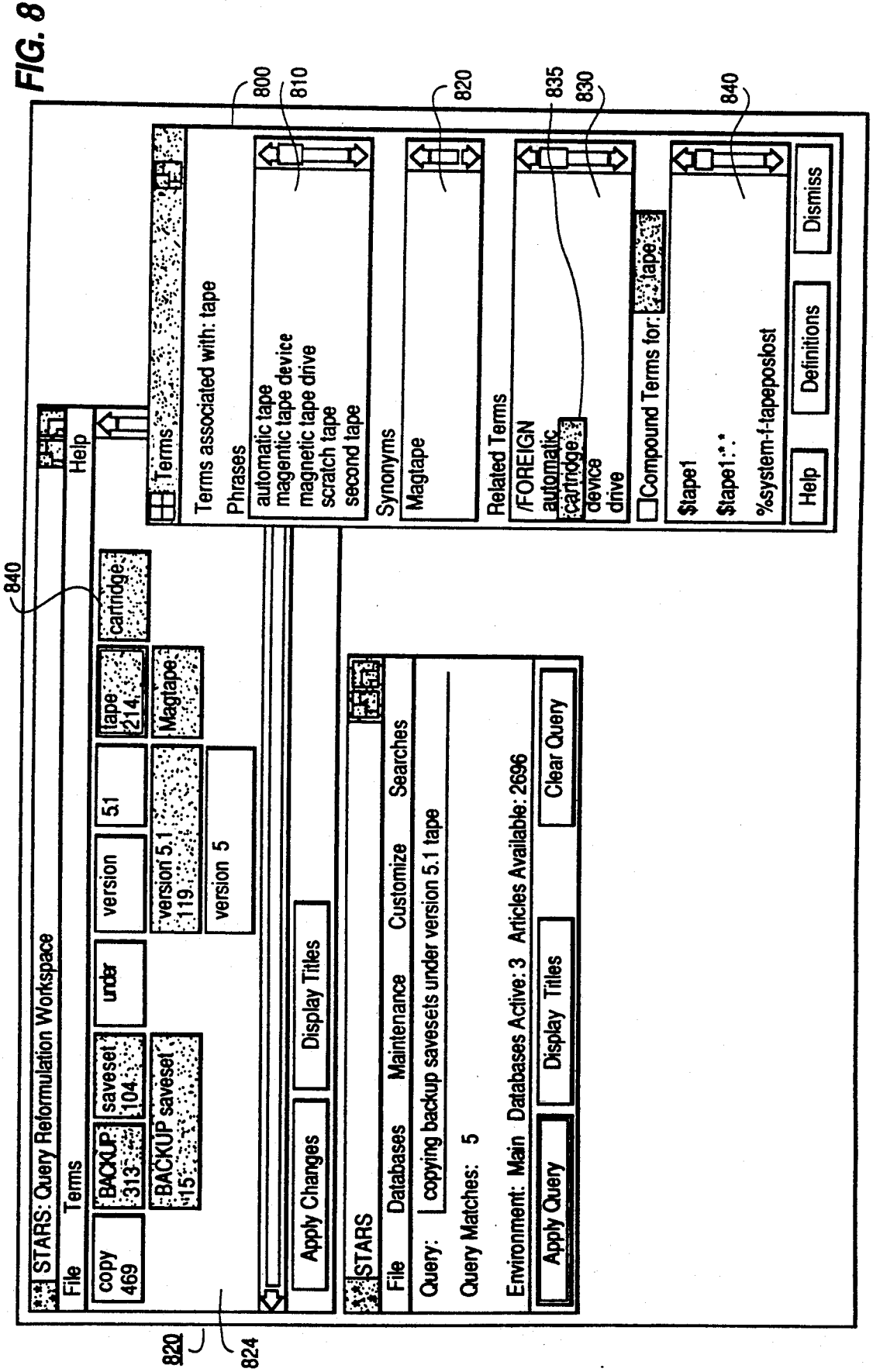
FIG. 8 is a representation of the screen display of FIG. 7, showing use of the newly-opened window to add a new related tile.

FIG. 8 is a representation of a screen display 820 showing use of TERMS window 800 to add a new related term to the Boolean query. In the example, the user has double clicked on the term "cartridge" 835 in the Related Term subwindow 830. This action causes a new "cartridge" tile 840 to be added to display area 824 in a next available column. New "cartridge" tile 840 is active. Thus, the Boolean query represented by FIG. 8 would now be:

(("BACKUP" AND "saveset") OR "BACKUP saveset") AND "version 5.1" AND ("tape" OR "Magtape") AND "cartridge."

H. Adding Phrases to the Display Using the Terms Window

Figure 9:
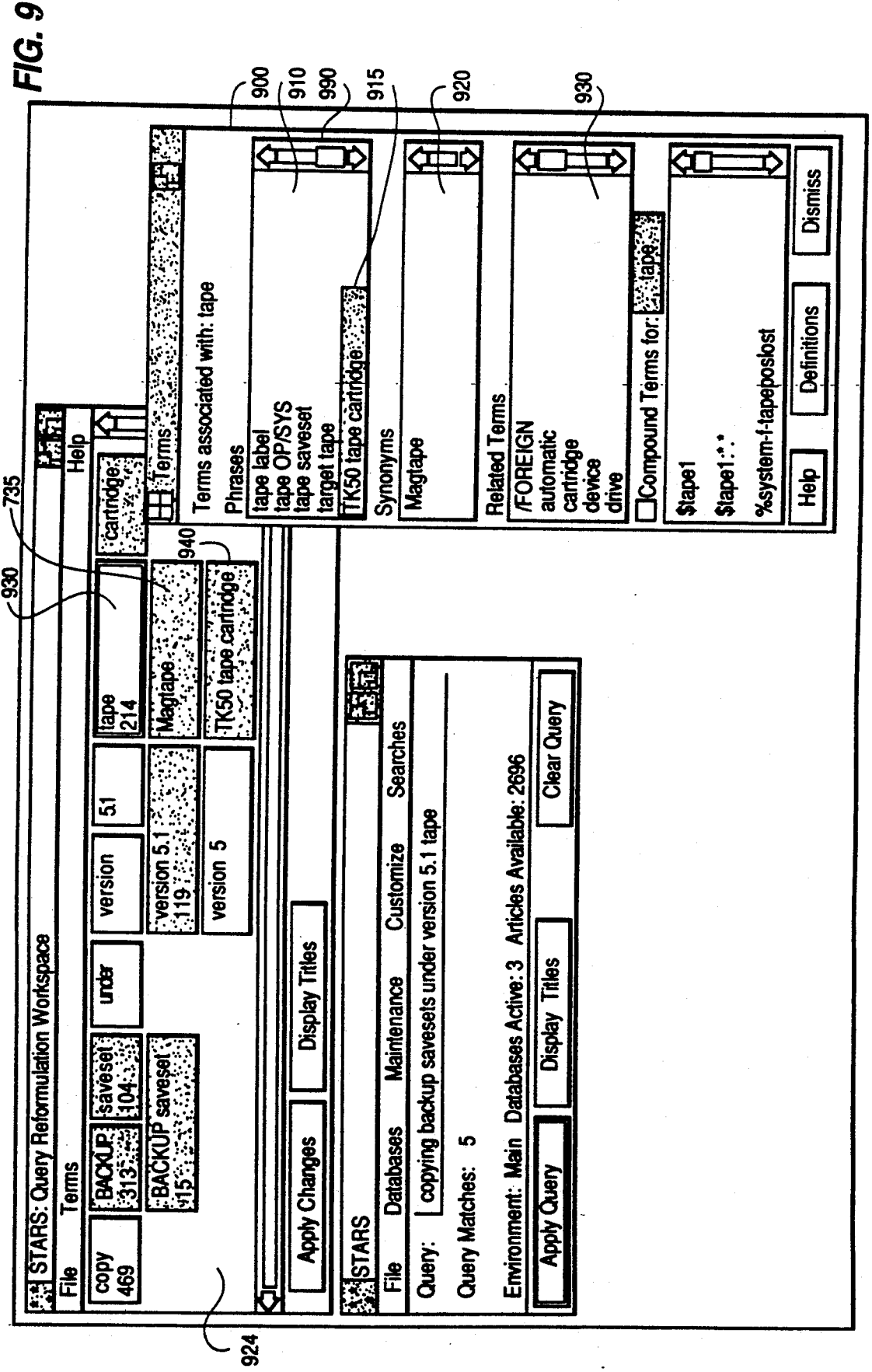
FIG. 9 is a representation of the screen display of FIG. 8, showing use of the newly-opened window to add a new phrase tile.

FIG. 9 is a representation of a screen display showing use of TERMS window 900 to add a phrase to the Boolean query. TERMS window 900 has different contents in the Phrases subwindow 910 because, in the example, the user has scrolled the contents of Phrases subwindow 910 using scroll bar 990 in a manner known to persons of ordinary skill in the art. In the example, the user has double clicked on the term "TK50 tape cartridge" 915 in the Phrases subwindow 910. This action causes a new "TK50 tape cartridge" tile 940 to be added to display area 924 in the same column as the selected "tape" tile 930, and below the "Magtape" tile 735. "TK50 tape cartridge" tile 940 is active. Thus, the Boolean query represented by FIG. 9 is:

(("BACKUP" AND "saveset") OR "BACKUP saveset") AND "version 5.1" AND ("Magtape" OR "TK50 tape cartridge") AND "cartridge."

I. Stretching a Tile

Figure 10:
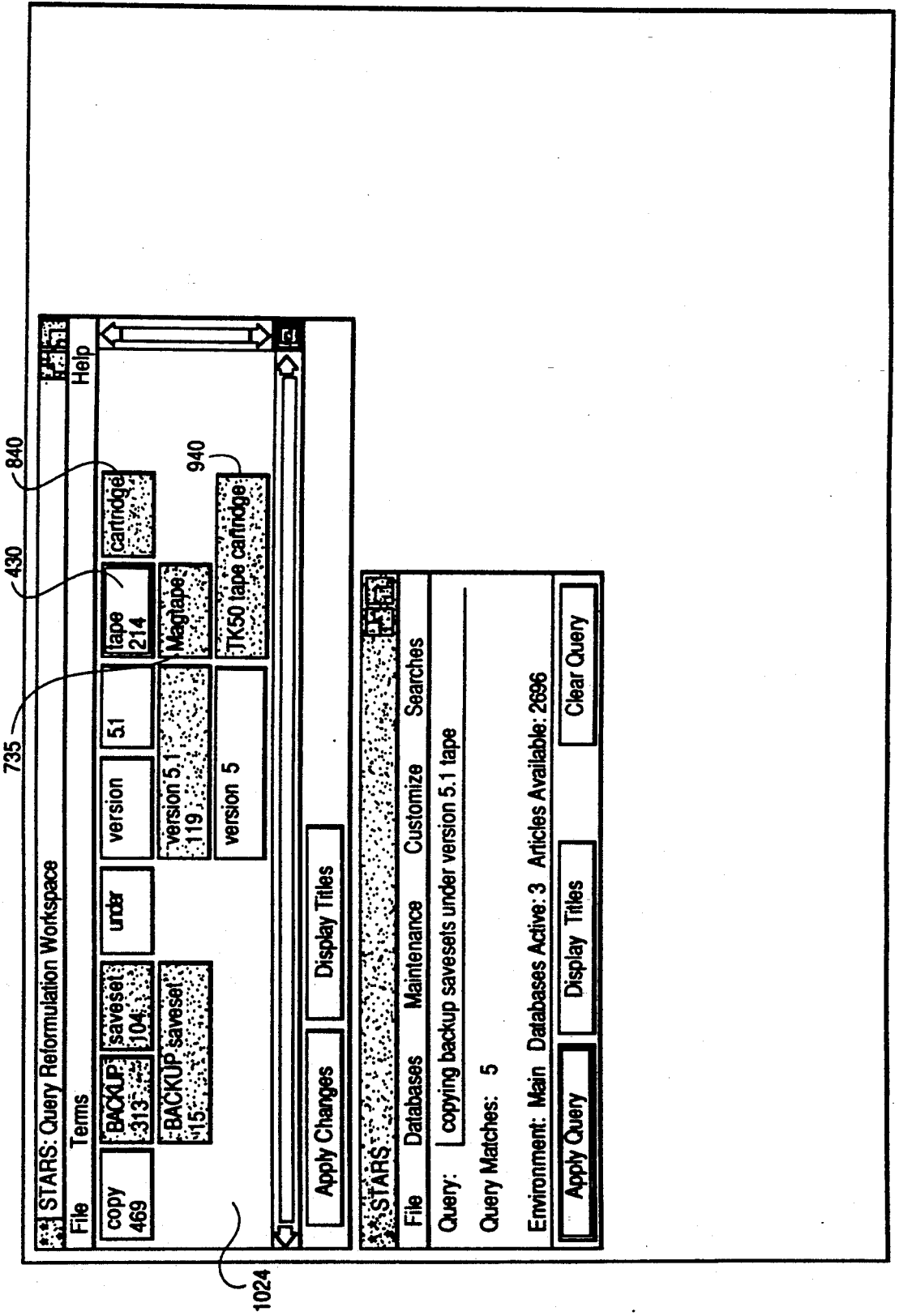
FIG. 10 is a representation of the screen display of FIG. 9 without the newly-opened window, showing a change in width of a tile of FIG. 9.

FIG. 10 includes a representation of a display area 1024 showing a change in width of tile 940 of FIG. 9. Changing the width of a tile is defined as changing a number of columns occupied by that tile. To change the width of tile 940, the user double clicks on the right edge of "TK50 tape cartridge" tile 940 and drags that edge into the column occupied by the "cartridge" tile 840. As shown in FIG. 10, the width of the column occupied by "tape" tile 430 and "Magtape" tile 735 shrinks to only the width necessary to display those tiles. The Boolean query represented by FIG. 10 changes because of the change in width and becomes:

(("BACKUP" AND "saveset") OR "BACKUP saveset") AND "version 5.1" AND (("Magtape" AND "cartridge") OR "TK50 tape cartridge").

J. Moving a Tile

FIG. 11 includes a representation of a screen area 1126 showing display area 1024 of FIG. 10 after tile 840 is moved. To move that tile, the user double clicks on "cartridge" tile 840 and drags it to a new position on the screen in a same column with "copy" tile 330. As FIG. 10 shows, the width of tile 330 expands slightly so that it is the same size as the tile 840, which was moved into the same column. Thus, the Boolean query represented by FIG. 11 is:

"cartridge" AND (("BACKUP" AND "saveset") OR "BACKUP saveset") AND "version 5.1" AND ("Magtape" OR "TK50 tape cartridge").

K. Explicit Boolean Terms

Figure 12:
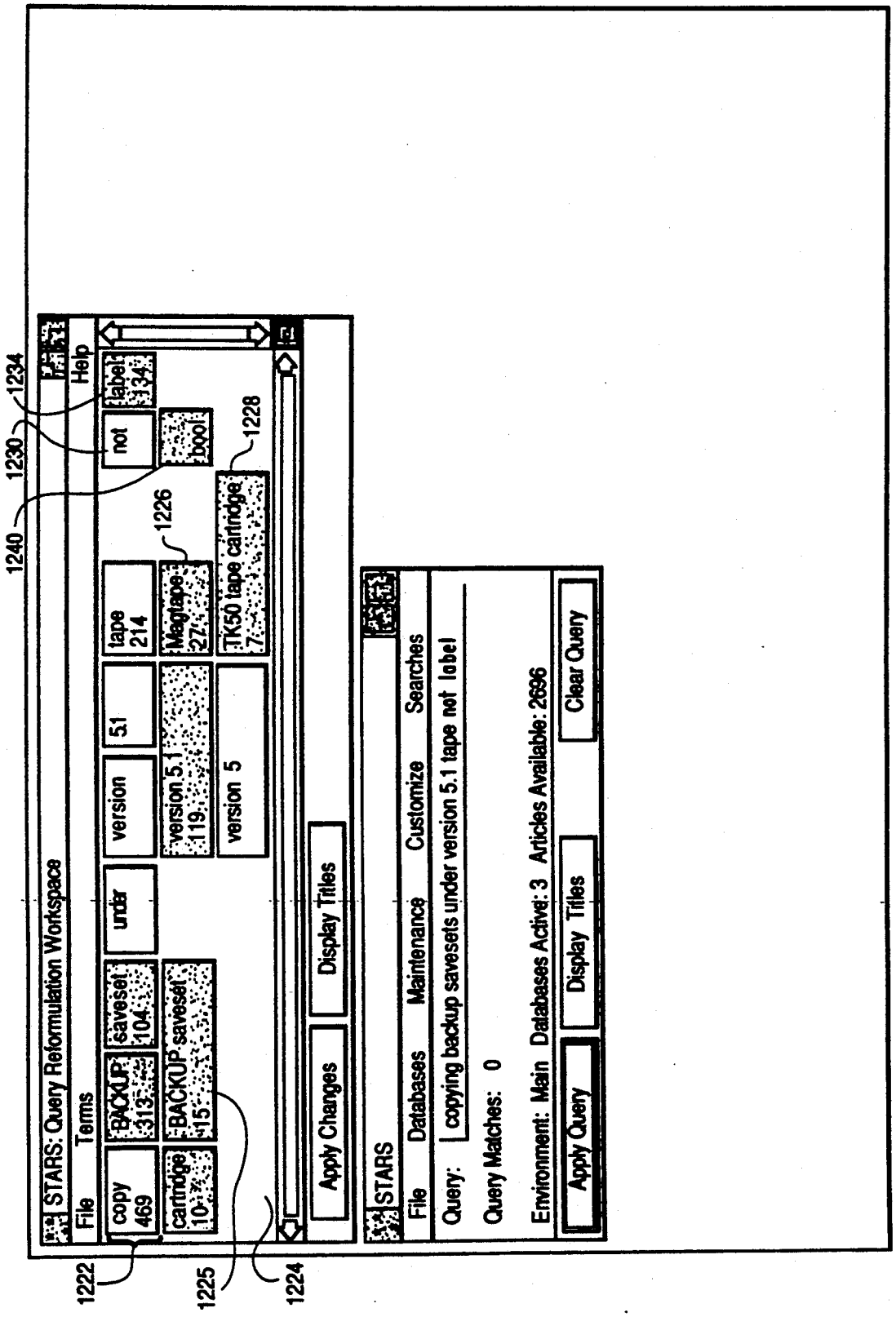
FIG. 12 is a representation of the screen display of FIG. 11, showing an additional query string containing an explicit Boolean operator and an additional new tile corresponding to the additional query string.

FIG. 12 includes a representation of a screen area 1224 showing an additional query string containing an explicit Boolean operator and a new tile. In the example, an additional query string of "not label," containing two terms ("not" and "label"), is added in a manner similar to the addition of a tile described in accordance with FIG. 4. Two new tiles 1230 and 1234 are added to first display line 1222. Because the term "not" is ambiguous and could either refer to the word "not" or the Boolean operator "NOT," an additional Boolean NOT tile 1240 is added in the same column as the "not" tile. In a preferred embodiment, the processor assumes that the term "not" is to be interpreted as a Boolean NOT and makes the Boolean NOT tile active. Thus, the Boolean query represented by FIG. 12 is:

"cartridge" AND (("BACKUP" AND "saveset")
OR "BACKUP saveset") AND "version 5.1"
AND ("Magtape" OR "TK50 tape cartridge")
AND (NOT("label")).

where "NOT" is a Boolean NOT operator.

L. Structured Databases

Figure 13:
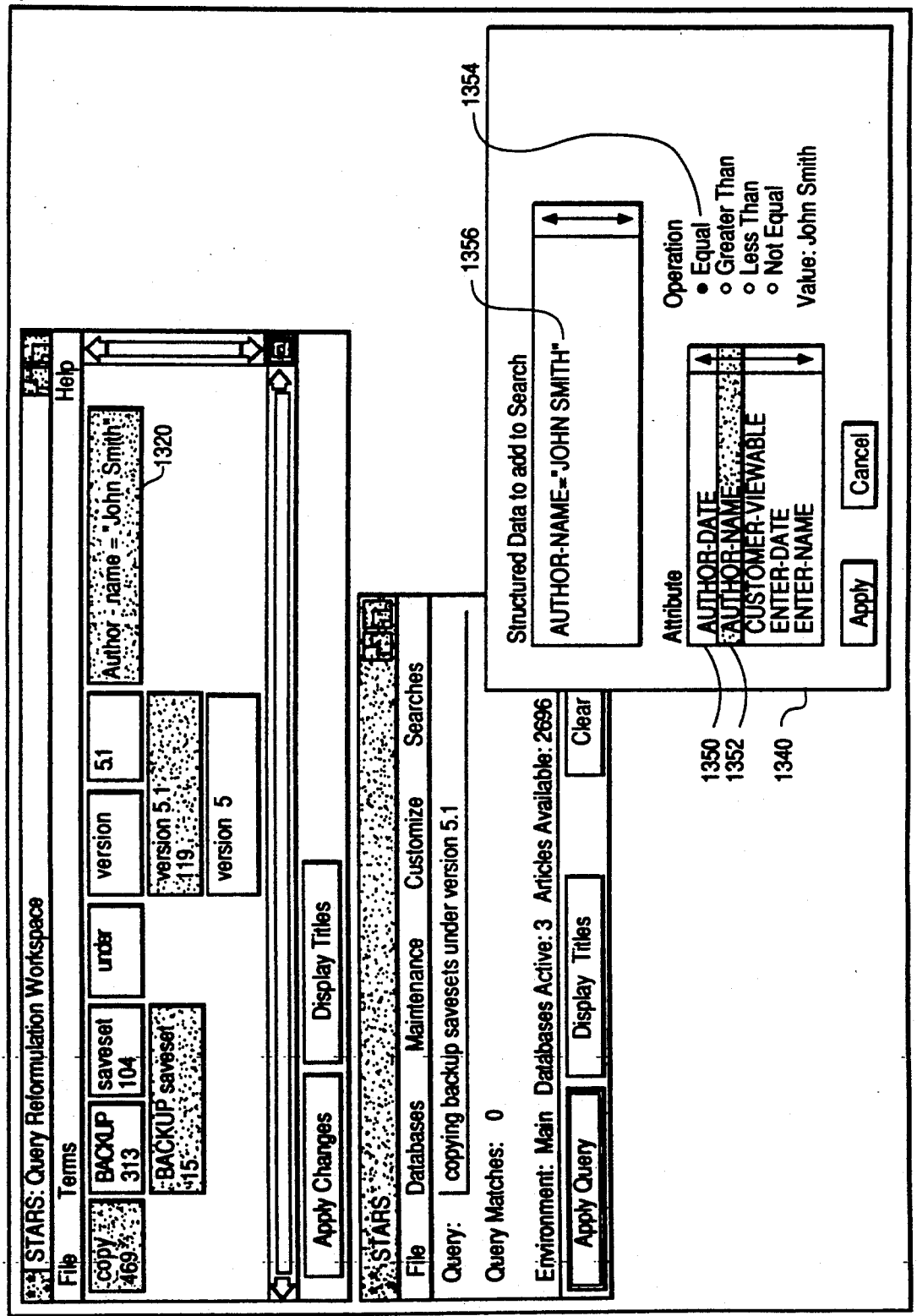
FIG. 13 is a screen display showing the addition to a display of a tile corresponding to a term for a search of a structured data base.

The following is a description of a preferred embodiment of the present invention where the database either is a structured database or contains structured items. FIG. 13 is a screen display showing the addition of a tile to a display corresponding to structured data in a database.

In FIG. 13, a STRUCTURED DATA window 1340 is opened through a pull-down menu or similar well-known manner. STRUCTURED DATA window 1349 includes a subwindow 1350 showing all attributes of a record in the structured database. In the example, the user has clicked on the "AUTHOR-NAME" attribute 1352 and indicated an operator "=" 1354 and a value "JOHN SMITH" 1356. Thus, the user has indicated a desire for all records containing an AUTHOR-NAME attribute field with a value of "JOHN SMITH." FIG. 13 further shows that a new tile 1320 "Author-Name=-JOHN SMITH" has been added to the first available column in query reformulation window 1312. The new tile is active. Thus, the Boolean query represented by FIG. 13 is:

"copy" AND "BACKUP saveset" AND "version
5.1" AND "Author-Name =JOHN SMITH."

The new tile 1320 of FIG. 13 is preferably stored in chart 1600 in a manner similar to that shown in FIG. 16. This discussion assumes that the software responsible for managing the database will be able to process a term of the form "attribute operator value," as this is the preferable term generated from chart 1600 that corresponds to tile 1320.

III. Preferred Implementation

The above discussion relates to the appearance of the display screens according to the present invention. The following discussion relates to a preferred to generate the display, and to allow the user to alter the Boolean query by manipulating the display. The following discussion intersperses discussion of the method with a discussion of the data structures used by the method.

A. Generating the Initial Display

Figures 14, 17:
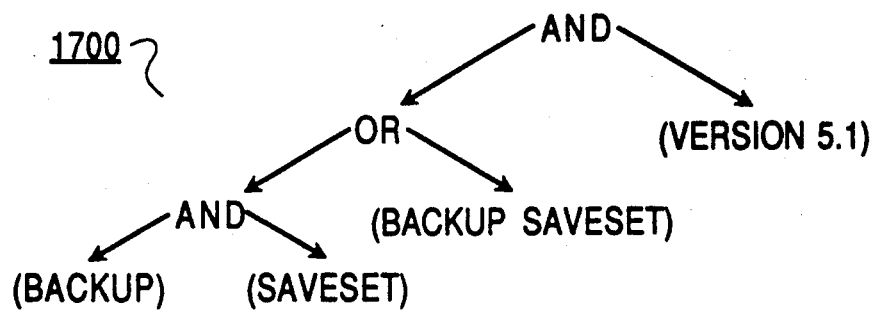
FIG. 14 is a drawing of a preferred input buffer data structure containing a received query string.
FIG. 17 is a drawing of a tree data structure representing a Boolean query generated from the chart data structure of FIG. 16.

FIG. 14 is a drawing of an input buffer data structure 1400 containing a received query string. Input buffer 1400 is a buffer containing ASCII characters (or characters of some other known character set) reflecting the characters entered by the user. Input buffer 1400 is used to generate the contents of query entry area 132.

FIG. 15 is a flowchart 1500 of a preferred series of steps performed by data processor 110 according to the present invention to display a query. In step 1502, a query string input by a user on keyboard 160 or a similar input device, is stored in input buffer 1400, and is displayed in area 232 as shown in FIG. 2. The query string is parsed, i.e., broken down into terms and analyzed to determine its syntactic constituents, such as noun phrases, in step 1504. In a preferred embodiment of the invention and as described below, the query string is parsed by a method known as "chart parsing" which is well-known to persons of ordinary skill in the art. Chart parsing is described in T. Winograd, "Language as a Cognitive Process, Vol. I: Syntax," pp. 116-127, published by Addison-Wesley Publishing Co. of Reading Mass., 1983, which is incorporated herein by reference. Any other parsing method that analyzes the query string and produces syntactic constituents could also be used without affecting the scope of the invention.

During parsing step 1504, the system slightly alters some of the parsed terms for display. These alterations include the following:

1. Citation forms (i.e., uninflected terms, such as would appear in a dictionary entry for a term) are substituted for inflected forms of terms, e.g., "copy" for "copying," "saveset" for "savesets," and "BACKUP" for "backup."
2. "Canonicalization" occurs, which means that certain canonical terms are chosen in addition to the terms of the input query string. For example, "version 5.1" is chosen in addition to "version" and "5.1."
3. Boolean operators (e.g., "AND," "OR," "NOT," "(," and ")") are identified.
4. "Generalization" occurs, which means that generalized terms are chosen in addition to the terms of the input query string. For example, "version 5" is chosen in addition to "version 5.1."
5. Noise words, such as "for" "under," "of," and "its" are identified, which are not used for searching. Identifying synonyms may also occur at this point.

FIG. 16 is a drawing of a chart data structure 1600 resulting from the chart parsing of step 1504. In a preferred embodiment, chart 1600 is a two-dimensional array of structures, where each structure 1602 corresponds to a term on the display. Each column of chart 1600 corresponds to a column on the display. Thus, chart 1600 should include a larger number of columns than would reasonably expected to be displayed. Terms that do not overlap are ANDed, while terms that overlap are ORed. Each term may occupy one or more columns on chart 1600. Terms are said to overlap if their corresponding tiles occupy at least one of the same columns. Tiles are said to "span" all columns that they occupy. For example, "BACKUP saveset" tile 1225 of FIG. 12 spans the second and third columns of display area 1224.

Tiles are said to "virtually span" all columns that they occupy and also all columns adjacent to columns that they occupy when the adjacent columns do not contain an active tile. For example, "BACKUP saveset" tile 1225 virtually spans the second, third, and fourth columns of display area 1224 because the third column is adjacent to tile 1225 and does not contain any active tiles. In addition, tiles virtually span all adjacent columns where the only active tiles spanning adjacent columns overlap the tile. For example, "Magtape" tile 1226 of FIG. 12 virtually spans the seventh and eighth columns of display area 1224 because it overlaps tile 1228, which is the only active tile spanning the eighth column.

A "clause" is a set of tiles that virtually span the entire configuration of tiles. Items that match the Boolean query will match a disjunction (Boolean OR) of one of the sets of clauses. In other words, the item will match at least one of every term to be ANDed together in the Boolean query.

When chart 1600 is first created by step 1504 of FIG. 15, the first row 1610 of chart 1600 contains the terms of the query string input in step 1502. These terms may be citation forms or other simplified forms of the terms of the input query. The second and subsequent rows 1620 of chart 1600 include canonicalized terms, generalized terms, and other terms, such as synonyms, generated by the system as alternatives to the terms of the input query.

FIG. 16 shows chart 1600 as containing the information used to generate a Boolean query. The terms are linked together in a "recency list" representing an order in which the terms were last manipulated on the display. In FIG. 16, the recency list is indicated by the arrows connecting the terms in chart 1600. Initially, the terms are linked together in the order that they are generated by the parsing step 1504. Later, if the user moves or adds a tile on the display, a corresponding term in chart 1600 is placed on the end of the recency list as the most recently altered term. The recency list is used to order the display of tiles. For example, tiles in a column are preferably displayed in each column in an order in which they appear on the recency list. A person of ordinary skill in the art would understand how to generate a screen display using chart 1600 and the recency list.

Each term structure in chart 1600 contains information such as whether the corresponding displayed term is active, a print string for the corresponding tile, a start column, and an end column, as shown by the exemplary structure 1602 of FIG. 16. A currently selected term is preferably indicated by a selected term pointer in memory 116, as shown in FIG. 1. Preferably, only one term is selected at a given time. A pointer 1604 also points to the next available column on chart 1600, i.e., the rightmost column not occupied by any terms.

In step 1506 of FIG. 15, the terms of the Boolean query are chosen. These ar the terms that will be initially displayed as active terms. Note that, after step 1506, the terms that will form the Boolean query are still stored in chart 1600 in memory 120. The terms are designated as active or inactive in chart 1600. The preferred rules for determining activity of tiles are as follows:

1. Noise words are inactive;
2. If a term is a component of a phrase, the word is inactive and the phrase is active;
3. If a term is a component of a canonical expression, the term is inactive. The most specific canonicalization is active;
4. If a term is a generalized expression, the term is inactive;
5. If the words "and," "or," "not," or other Boolean operators appear, the Boolean tile is active and the non-Boolean tile is inactive; and
6. If the embodiment generates tiles for synonyms, the synonym tiles are active.

In step 1508 of FIG. 15, data processor 110 converts the terms of the Boolean query from the internal form of chart 1600 into a Boolean query of a form suitable for searching database 135. FIG. 17 shows an AND/OR tree data structure 1700 of a type commonly known to persons of ordinary skill in the art. In FIG. 17, the internal nodes of the AND/OR tree 1700 are Boolean operators and the leaf nodes are terms. The method of generating AND/OR tree 1700 from chart 1600 will be discussed in more detail below.

Processor 110 searches database 135 using the generated Boolean query, i.e. AND/OR tree 1700, and counts both the number of database items in which each term is found and the number of times an item satisfying the Boolean query is found (step 1510). In step 1512, processor 110 determines the number of database items in which each term is found. Processor 110 also determines the number of items found that satisfied the Boolean query in Query Matches field 234 (step 1512). In step 1514, processor 110 generates the display from the internal form of the stored terms. As discussed above, a person of ordinary skill in the art could generate the display from chart 1600 and the recency list of FIG. 16.

Although in the preferred embodiment of the present invention, a search is performed by processor 110 using the generated Boolean query before the user has manipulated the Boolean query, this is not required. The search could just as easily be performed after the user has had a chance to review and manipulate the Boolean query. In such a case, the display would not initially include a Query Matches field 234 and would not display a number of matches found for each tile corresponding to a term of the Boolean query. Because a principal object of the invention is to allow the user to manipulate the Boolean query and to perform a search based on the manipulated query, the scope of the invention does not depend upon whether a search is performed prior to the manipulation of the display.

B. Manipulating the Display

Figure 18A:
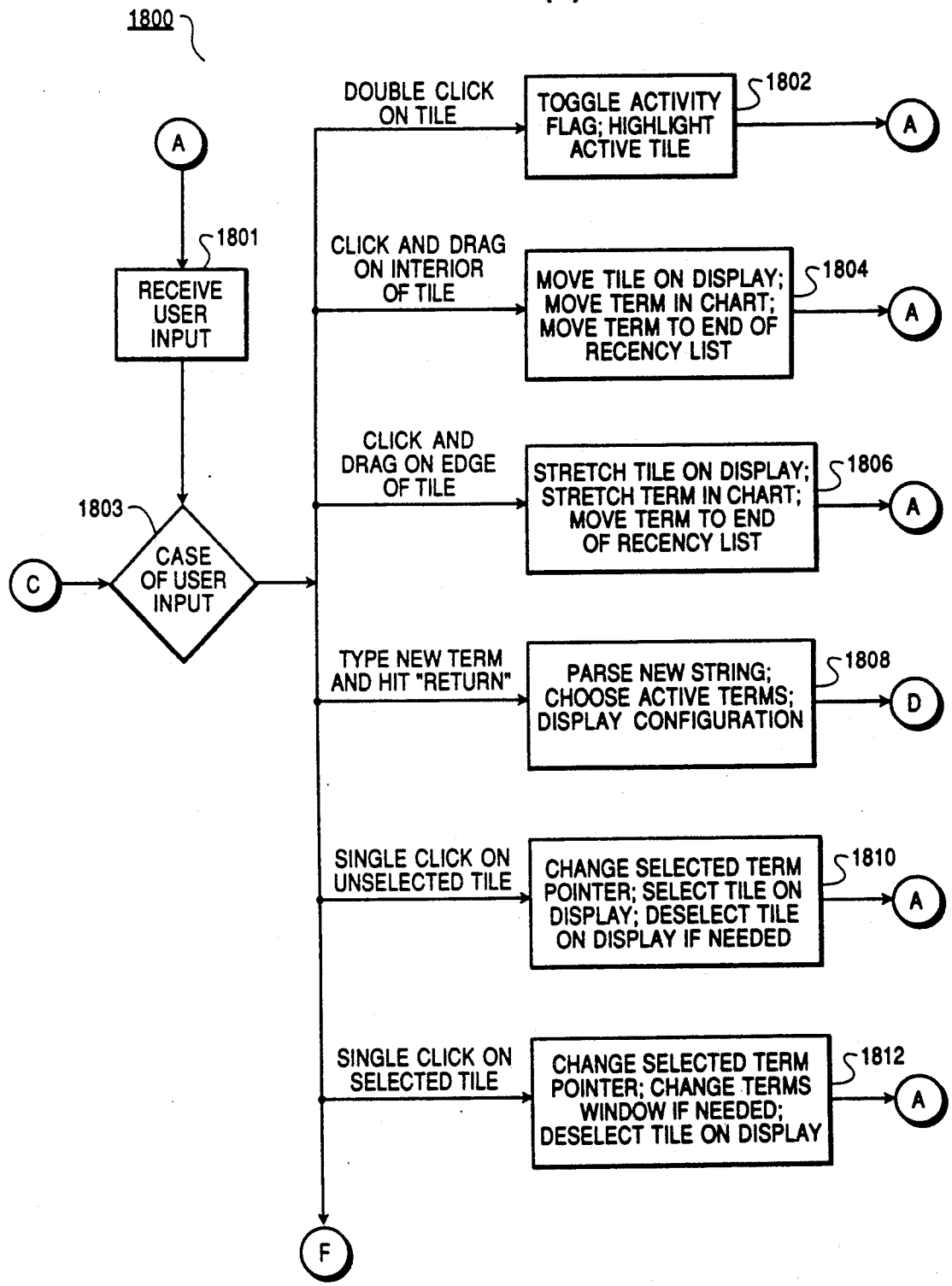
FIG. 18(*a*) is a flowchart of a series of steps performed by the preferred method of the present invention to manipulate a displayed query.
Figure 18B:
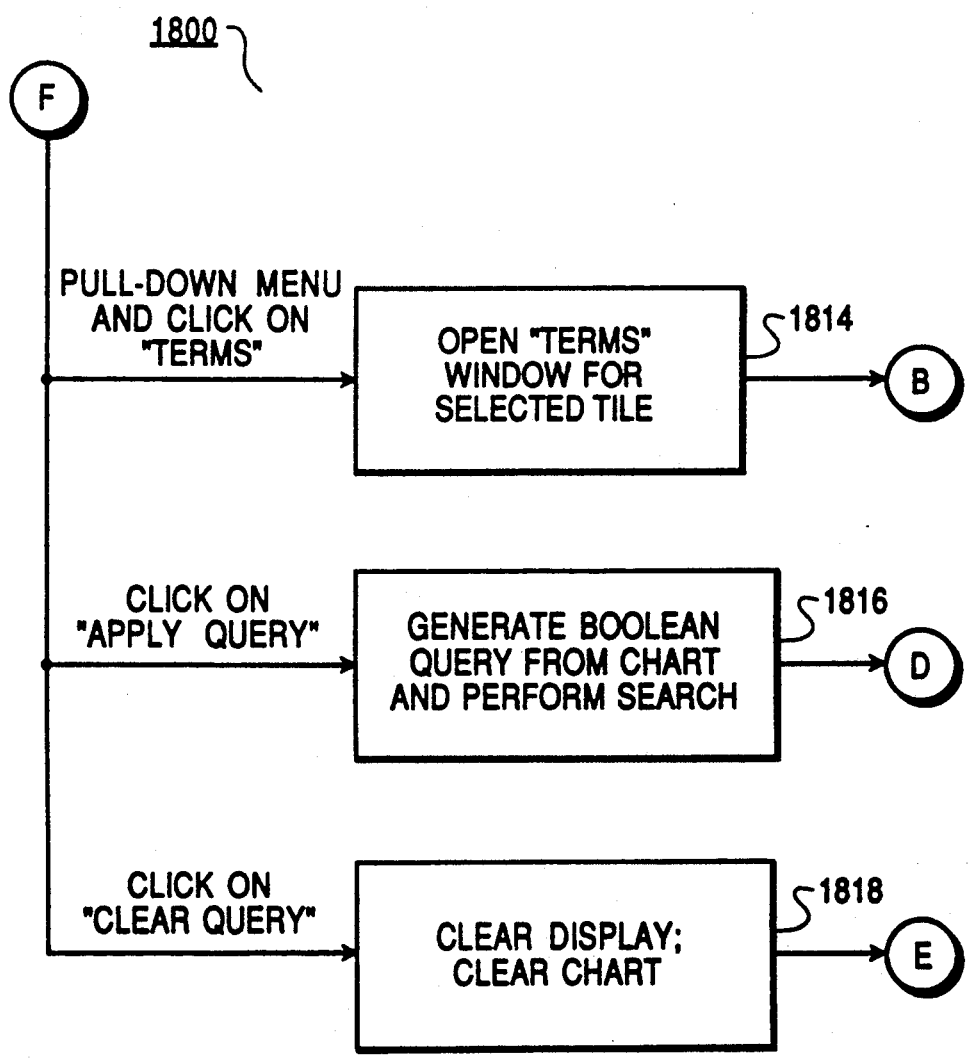
Figure 19:
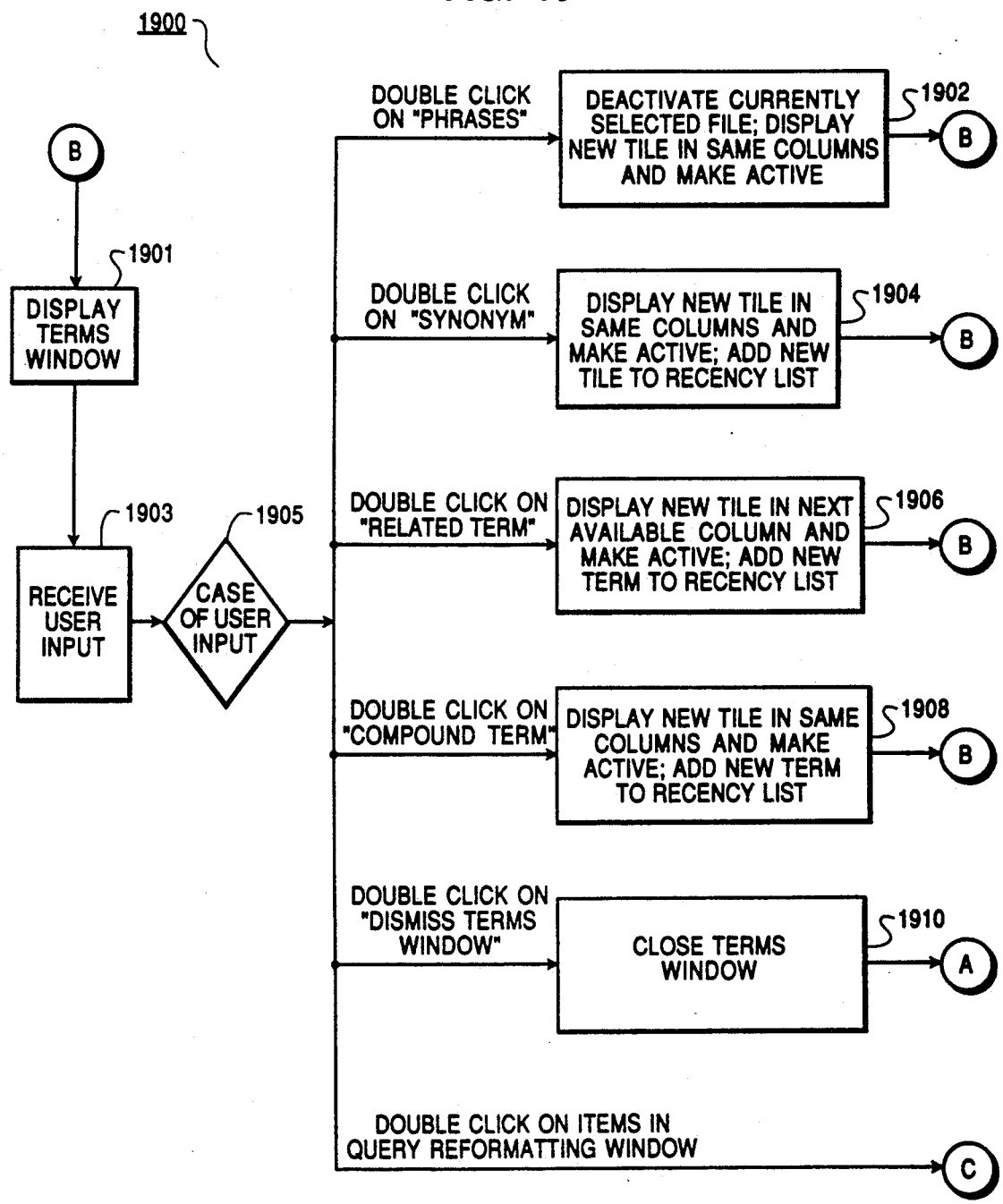
FIG. 19 is a flowchart of a further series of steps performed by a preferred method of the present invention to manipulate a query.

After the initial query is parsed and displayed, the display appears similar to the display of FIG. 2 and is ready to be manipulated by the user. FIGS. 18 and 19 are flowcharts 1800 and 1900 of a preferred series of steps according to the present invention to manipulate a displayed query. The types of input that can be entered by the user and their effect on display 150 and chart 1600 are discussed in connection with these Figures.

Processor 110 receives user input, preferably from keyboard 160 or mouse 170, in step 1801. In step 1803, processor 110 determines what user input was entered and sends control to a correct one of steps 1802 through 1818 as described below.

If, in step 1802, the user "double clicks" on a tile, the "activity" of that tile is toggled. In other words, if the user double clicks on an active tile, the tile becomes inactive, and if the user double clicks on an inactive tile, that tile becomes active. The preferred implementation of this activity change involves changing the term activity flag for the corresponding term stored in chart 1600. The double clicking toggles the activity flag 1650 in the structure of chart 1600 corresponding to the tile is toggled. Then control returns to step 1801.

If, in step 1804, the user "clicks and drags" on an interior area of a tile, processor 110 moves that tile to the location on the display where the user releases the mouse button. This function is also implemented in chart 1600. In chart 1600, a structure corresponding to the moved tile is deleted from its current position and inserted in a position in chart 1600 corresponding to the display position where the mouse button was released. The structure is also deleted from the recency list of chart 1600 and inserted at the end of the recency list. In addition, each time a tile is moved, the display screen is redrawn if necessary. For example, if a tile is the only tile in a column, moving that tile causes all tiles to the right of the moved tile to shift one column to the left. As a second example, the tile directly below a moved tile may need to be moved up to fill the empty space when the display is redrawn. The activity flag of the tile is not changed by a move. Both active and inactive tiles may be moved. After processor 110 moves the tile to a new location, control returns to step 1801.

If, in step 1806, the user "clicks and drags" an edge of a tile, that tile is "stretched" until the user releases the mouse button. This "stretching" is implemented in chart 1600 by stretching the affected term so that is occupies a same number of columns corresponding to the displayed tile, and is made "most recent" on the recency list. Both active and inactive tiles can be stretched so the activity flag remains fixed. Next, control returns to step 1801.

If the user enters an additional query string including at least one new term and followed by the "RETURN" key on keyboard 160 or by clicking on "Apply Query," several activities take place, as shown in step 1808. First, the additional query string is parsed in the manner described below, which is the same manner described in connection with step 1504 of FIG. 15. Next, processor 110 determines active tiles as described in connection with step 1506, and a new tile is added to the display for each term in the additional query string. New tiles are added in the first unoccupied display column.

The preferred implementation of this function involves chart 1600 of FIG. 16. In chart 1600, new terms are added at the column pointed to as the next available column, and a new next available column is chosen. The new terms are added to the end of the recency list of chart 1600. New terms are indicated to be either active or inactive according to the rules described above in connection with step 1506 of FIG. 15. Next, control passes to step 1508, where a Boolean query is generated from the internal forms of the terms currently active on the display screen, database 135 is searched using the generated Boolean query, and the resulting items are displayed on the screen.

If the user "single clicks" on an deselected tile, the tile is selected and the previous selected tile (if any) is deselected (step 1810). The "selected term" pointer data structure is changed accordingly.

If the user "single clicks" on a selected tile, the tile is deselected (step 1812). The "selected pointer" data structure is changed accordingly. Next, control returns to step 1801.

If the user "pulls down" the TERMS menu and selects "TERMS" from the TERMS menu (step 1814), the TERMS window is opened (step 1814), as described below in connection with FIG. 19. Next, control passes to step 1901 of FIG. 19.

If the user presses the "RETURN" key or clicks on "Apply query," several activities take place (step 1816). First, a Boolean query is generated from the internal forms of the terms currently active on the display screen (step 1508), database 135 is searched using the generated Boolean query (step 1510), and the resulting items are displayed on the screen (step 1514).

If the user clicks on "Clear Query," different activities take place. First, the current Boolean query is cleared from the screen, chart 1600 is cleared, and the query reformulation window 132 is cleared (step 1818). Next, control returns to step 1502 of FIG. 15.

FIG. 19 is a flowchart 1900 of a preferred series of steps to manipulate a query in accordance with the present invention. In step 1901, TERMS window 600 is displayed as discussed above in connection with FIG. 6. In step 1903, processor 110 receives user input, preferably from keyboard 160 or mouse 170. In step 1905, processor 110 determines what user input was entered and sends control to a correct one of steps 1902 through 1910 as described below. Each type of input that can be entered by the user and its effect on display 150 and chart 1600 is discussed below.

If the user double clicks on an entry in the Phrases subwindow 610, shown in FIG. 6, the activities shown in step 1902 take place. To begin, the currently selected tile is made inactive. An active new tile corresponding to the clicked term is displayed in the same column(s) as the previously selected tile. In chart 1600, a new term is added in the same column(s) as the term corresponding to the selected tile, the new term is added to the recency list. Finally, the previously selected tile is noted as inactive, and the new tile is noted as active. Control then returns to step 1901.

If the user double clicks on an entry in the Synonyms subwindow 620 in FIG. 6 the activities of step 1904 take place. First, the activity flag of the selected tile is unchanged. Next, an active new tile corresponding to the clicked term is displayed in the same column(s) as the selected tile. In chart 1600, this is accompanied by adding a new term in the same column(s) as the term corresponding to the selected tile, by adding the new term to the recency list, and by setting the new tile as active. Next, control returns to step 1901.

If the user double clicks on an entry in the Related Terms subwindow 630 of FIG. 6 the activities of step 1906 take place. First, the activity of the currently selected tile remains unchanged. Next, an active new tile corresponding to the clicked term is displayed is the first available column. In chart 1600, this is accomplished by adding a new term in the first available column, adding the new term is added to the recency list and setting the new term as active. Next, control returns to step 1901.

If the user double clicks on an entry in the Compound Terms subwindow 640 of FIG. 6, the activities of step 1908 take place. First, the currently selected tile is made inactive and an active new tile corresponding to the clicked term is displayed is the same column(s) as the previously selected tile. In chart 1600, this is implemented by adding a new term in the same column(s) as the term corresponding to the previously selected tile, adding the new term to the recency list, setting the previously selected tile as inactive, and setting the new tile as active. Next, control returns to step 1901.

If the user clicks on "Dismiss" button 666, TERMS window 600 is closed in step 1910 and control passes to step 1801 of FIG. 18.

If in the user moves the cursor out of TERMS window 600 and enters an input in query reformulation window 230, control passes to step 1803 of FIG. 18.

C. Generating a Boolean Query

Preferably, a Boolean query is generated through a recursive "divide and conquer" method. When the method is applied to chart 1600 of FIG. 16, it generates an AND/OR tree data structure, such as that shown in FIG. 17. The "divide" part of the method splits a group of terms into a plurality of smaller groups of terms, to which the method is recursively applied. The "conquer" part of the method groups multiple a together into a single larger tree by supplying a new AND or OR internal node. Once a tree is generated for all the active terms in chart 1600, it can be used by the database manager to search the database.

The preferred method handles both implicit Boolean operations, which are those operations implied by the placement of terms in chart 1600, and explicit Boolean terms, which are placed in chart 1600. The process of splitting and regrouping terms recursively into a tree is known to persons of ordinary skill in the art. Processing of all explicit Boolean terms is handled at the beginning of the recursive method. Subgroups that contain no explicit Boolean terms are passed on to a default part of the method that handles implicit Boolean terms.

The default part of the method is complicated by terms that can span multiple columns and that can overlap each other. As described above, terms in overlapping columns are interpreted as representing alternatives (a Boolean OR). Terms that appear in non-overlapping columns are interpreted as representing a Boolean AND operation. In a preferred embodiment, a Boolean NOT operation can only be represented explicitly. Typically, a user will not generate extremely complex Boolean queries. The method described below, however, will handle queries having such complications as overlapping terms, even though the usefulness of such queries is not always readily apparent.

FIG. 20 is a flowchart 2000 of a preferred series of steps performed by a method of the present invention to generate a Boolean query from chart 1600. Chart 1600 may correspond to modifications made by a user to display 150. FIG. 20 describes the processing of all explicit Boolean terms in chart 1600.

In a first step 2002, processor 110 determines whether a next term in chart 1600 is a non-nested left parenthesis. If so, a matching right parenthesis is found in step 2004 and the terms are divided into three parts in step 2006. Part one includes the terms to the left of the left parenthesis, part two includes the terms between the parentheses, and part three includes the terms to the right of the right parenthesis.

In step 2008, processor 110 recursively calls the Process Boolean Terms method 2000 of FIG. 20, using part one of the Boolean query. Thus, the recursion begins. When control returns from the first recursive call, processor 110 then calls the method 2000 of FIG. 20 in step 2010 for part two. When control returns from the recursive calling step 2010, processor 110 calls the method 2000 of FIG. 20 in step 2012, for part three. In flowchart 2000, "T1," "T2," and "T3" represent the results of recursive calls. When control returns from the calling step 2012, processor 110 in step 2014 returns an "AND" node connecting the results of the three recursive calls of steps 2008, 2010, and 2012.

If a non-nested left parenthesis is not found in step 2002, control passes to step 2016, which determines whether a next term in chart 1600 is a non-nested explicit Boolean "OR" term. If so, the terms are divided into two parts in step 2018. Part one includes the terms to the left of the "OR" term and part two includes the terms to the right of the "OR" term. In step 2020 processor 110 calls the method 2000 of FIG. 20 for part one from the "OR" subdivision. When control returns from the call in step 2020, processor 110 calls method 2000 in step 2022 for part two from the "OR" subdivision. When control returns from the recursive call in step 2022, processor 110 in step 2024 returns an "OR" node connecting the results of the two recursive calls in steps 2020 and 2022.

If a non-nested explicit Boolean OR is not found in step 2016, control passes to step 2026, which determines whether a next term in chart 1600 is a non-nested explicit Boolean "NOT" term. If so, a first contiguous group is found in step 2028. Preferably, to find a contiguous group, processor 110 searches, beginning in a column immediately, after the explicit NOT term, for a group of terms which is either grouped by parentheses or which is terminated by a "point." A point is defined as a place between two columns which has no spanning terms.

Next, the terms are divided into three parts in step 2030. Part one includes the terms to the left of the contiguous group, part two includes the terms of the contiguous group, and part three includes the terms to the right of the contiguous group. Next, in steps 2032, 2034, and 2036, processor 110 recursively calls the method 2000 of FIG. 20, for parts one, two and three, respectively. In step 2038, processor 110 returns an "AND" node connecting the results of the recursive calls in steps 2032 and 2036 with a "NOT" node connected to the results of the call in step 2034.

If a non-nested Boolean NOT is not found in step 2026, control passes to step 2040, which determines whether a next term in chart 1600 is a non-nested explicit Boolean AND term. If so, the terms are divided into two parts in step 2042. Part one includes the terms to the left of the explicit "AND" term and part two includes the terms to the right of the explicit AND term. Processor 110, then, in steps 2044 and 2046 recursively calls the method 2000 of FIG. 20 for parts one and two, respectively. When control returns from the recursive calls, processor 110 in step 2048 returns an "AND" node connecting the results of the two recursive calls in steps 2044 and 2046.

If a non-nested explicit Boolean AND is not found in step 2040, then all explicit Boolean operators have been processed and control passes to step 2050, for processing the non-Boolean terms, the steps of which are shown in FIG. 21.

FIG. 21 is a flowchart 2100 of the steps for processing implicit Boolean terms.

In step 2102, processor 110 determines whether a group that was recursively passed to the method is empty. A "group" is one or more terms in chart 1600. If so, in step 2104, processor 110 returns control to the calling routine.

In step 2106, processor 110 determines whether the group is a single column of terms. If so, in step 2108, processor 110 returns an "OR" node connecting all the terms in the column.

If the group is not a single column of terms in step 2106, in step 2112 processor 110 finds a smallest set of spanning terms. This process is preferably, performed as follows. A group of terms occupies a set of columns in chart 1600. First, a point is found between two of these columns that has a fewest number of terms spanning it. The method splits the group of terms into three subgroups. A first subgroup contains all the terms to the left of the point. A second subgroup contains all terms to the right of the point. A third subgroup contains all terms that span the point. Step 2112 returns all three subgroups. In step 2114, processor 110 recursively calls the method 2100 of FIG. 21 for subgroup 1 generated in step 2116. When control returns, processor 110 calls the method 2100 for subgroup 2 in step 2116. When control returns, processor 110 in step 2118 creates a Boolean "AND" node connecting the results of the calls in steps 2112 and 2114. These two subgroups are ANDed together because they contain a "compatible interpretation," i.e., none of the terms in subgroups 1 and 2 overlap. This is true because the terms in subgroup 1 came before the point and the terms in subgroup 2 came after the point.

In step 2120, processor 110 determines whether an empty subgroup 3 was returned from step 2112, i.e., if no subgroups overlapped the point. If so, processor 110 returns, in step 2122, the "AND" node of step 2118 and processing at the current level of recursion is ended. Otherwise, an alternative interpretation must be constructed from the terms in subgroup 3 because they overlap at least some of the terms in subgroups 1 and 2. Processor 110 performs this alternative interpretation in step 2124.

In step 2124, processor 110 constructs a new group of terms from the terms returned in step 2112. The new group of terms is constructed by taking those terms returned in subgroup 3 from step 2112 (the terms that overlapped the point), and adding to them any terms from subgroups 1 and 2 which are "almost compatible" with subgroup 3. Processor 110 defines a term in subgroups 1 and 2 to be "almost compatible" with subgroup 3 if the term does not overlap at least one of the terms in subgroup 3. Because of the recursive nature of this method, later recursions handle incompatibilities in the newly constructed group.

A preferred method performed by processor 110 of finding "almost compatible" terms in subgroups 1 and 2 is to find the term in subgroup 3 that has a rightmost starting column, and to find the term in subgroup 3 having a leftmost ending column. A1 terms in subgroup 1 that are to the left of the term with the rightmost starting column are "almost compatible" and are included in the newly constructed group. All terms in subgroup 2 to the right of the term with the leftmost ending column are also "almost compatible" and are also included.

Once a new group has been constructed, processor 110 in step 2124 recursively calls method 2100 for the new group. When control returns from the call of step 2124, processor 110 in step 2126 creates a Boolean "OR" node connecting the results of step 2124 with the "AND" node created in step 2118. This Boolean "OR" node is returned by processor 110 and the current level of recursion is ended.

In the above-described method, there are two degenerate cases, which constitute the stopping points of the recursion. The first case is an empty column in chart 1600, which becomes an AND of no terms of step 2104. The second case is a set of one or more edges, all of which span the same column or columns. These are ORed together in step 2108.

In the above-described method, empty columns are not included in the generated Boolean query. If they were, the search would return no matches. Thus, an AND of no terms is considered to match all items, not the null set.

In the above-described method, the tree that results from processing the Boolean and default part of the method contains many unnecessary Boolean operator nodes. Simple rules, well known to person of ordinary skill in the art preferably are applied to compress the tree. For example, nested ANDs and nested ORs are merged, an AND of no terms is removed, and an OR of a single term becomes the term. Other simplification rules will be obvious to persons of ordinary skill in the art.

FIGS. 22 and 23 are examples of the method steps 2112-2126. FIG. 22(a) represents terms stored in chart 1600. When the method is applied, the starting group of terms is [A B C D]. The "find smallest terms" step 2112 finds point 2, because it has no overlapping terms, and splits the starting group into Group 1 [A B C] and Group 2 [D]. Group 1 is re-analyzed, and point 1 is found as having one overlapping term, thus yielding Subgroup 1 to be [A], Subgroup 2 to be [B] and Subgroup 3 to be [C]. Subgroup 1 is one of the degenerate cases, and generates the tree shown in FIG. 22(b). Similarly the tree in FIG. 22(c) is created for Subgroup 2 and the tree in FIG. 22(d) is created for Subgroup 3. Subgroup 1 and Subgroup 2 are mutually compatible, and are ANDed together, as shown in FIG. 22(e). The result of this step are ORed with the processing of Subgroup 3, which yields the tree of FIG. 22(f). Finally, the results of the original Group 1 is compatible with Group 2, and they are ANDed together, as shown in FIG. 22(g). Last, compression removes the redundant single ORs at the bottom of the tree, to generate a final Boolean query tree of FIG. 22(h).

FIG. 23 shows a second example of Boolean query tree generation. This example shows how the method handles anomalous situations in chart 1600. As mentioned above, the utility of such a query is questionable. The example does illustrate, however, the way that a space left in chart 1600 by an inactive term is handled.

FIG. 23(a) shows a starting group of active terms [A D E F]. Terms B and C are not included because they are inactive. The method initially chooses 1 as a first division point, since both 1 and 2 have the same number of overlapping terms. Group 1 becomes [A], Group 2 becomes [E] and Group 3 becomes [D F]. Group 3 is further subdivided at point 2 into Subgroup 1 [D], Subgroup 2 [], and Subgroup 3 [F]. The tree returned for Subgroups 1, 2, and 3 are respectively shown in FIGS. 23(b)-(d).

Note that the tree for Subgroup 2 is empty. The result of joining these three Subgroups together generates the tree shown in FIG. 23(e). Finally, the trees for all three groups are joined, as shown in FIG. 23(f) and compressed to yield the tree shown in FIG. 23(g).

IV. Summary

In summary, the present invention allows a user to view a system-generated Boolean query in an easy to understand manner. Moreover, the user may manipulate the displayed query to yield a new display, which is used to generate a new Boolean query.

Other embodiments will be apparent to those skilled in the art from consideration of the specification and practice of the invention disclosed herein. It is intended that the specification and examples be considered as exemplary only, with a true scope of the invention being indicated by the following claims.

What is claimed is:

1. A method for graphically displaying and manipulating a Boolean query stored in a memory of a data processing system, the Boolean query including a plurality of terms, and the method including the steps, performed by the data processing system, of:

organizing the query as a plurality of graphic display tiles, each tile deemed an active tile corresponding to a different term in the Boolean query;

displaying the plurality of tiles in a two-dimensional configuration that represents the Boolean query;

receiving information representing changes to the two-dimensional configuration of the displayed tiles, said changes corresponding to changes in the Boolean query;

manipulating the two-dimensional configuration of the displayed tiles in response to the received information to represent the corresponding changes to the Boolean query; and generating a new Boolean query in the memory of the data processor to reflect the manipulated configuration.

2. The method of claim 1, further including the step of searching a data base in the memory of the data processor using the generated Boolean query.

3. The method of claim 1, further including the step of receiving a Boolean query as a user input to the data processing system.

4. The method of claim 3, wherein the step of displaying the tiles further includes the step of displaying inactive tiles, which are not used to generate the Boolean query.

5. The method of claim 3, wherein the step of displaying the tiles includes the substep of:

displaying the two-dimensional configuration as one or more adjacent columns, wherein a tile is deemed to virtually span all the columns it spans plus any adjacent columns under at least one of the following conditions:
 a) if there is no other one of said active tiles spanning the adjacent columns, and
 b) if the only one of said active tiles spanning adjacent columns overlap the tile,
 wherein a clause is a Boolean AND of terms corresponding to a group of active tiles that do not virtually span at least one of the same columns,
 wherein a set of clauses includes an active virtually spanning each column in the configuration having at least one active tile, and
 wherein the Boolean query represented by the display is a Boolean OR of all the sets of clauses represented by the configuration.

6. The method of claim 3, further including the step of searching a data base in the memory of the data processor using the generated Boolean query.

7. The method of claim 1, wherein the step of manipulating the configuration includes the step of changing one of said active tiles to an inactive tile.

8. The method of claim 1, wherein the step of manipulating the configuration includes the step of changing one of said tiles from an inactive to an active tile.

9. The method of claim 1, wherein the step of manipulating the configuration includes the step of moving a one of said tiles to a new location in the two-dimensional configuration.

10. The method of claim 1, wherein the step of displaying the tiles includes the substep of:

displaying the two-dimensional configuration as one or more adjacent columns of said tiles, wherein each of the tiles is deemed to span all of the columns it occupies, and wherein two of said tiles are deemed to overlap if they span at least one of the same columns of the two-dimensional configuration, and
 wherein a clause is a Boolean AND of terms corresponding to a group of active tiles that do not overlap,
 wherein a set of clauses includes an active tile spanning each column in the configuration having at least one active tile, and
 wherein the Boolean query represented by the display is a Boolean OR of all the sets of clauses represented by the configuration.

11. The method of claim 4, wherein the step of manipulating the configuration includes the step of changing a number of columns occupied by one of said tiles.

12. The method of claim 1, wherein the organizing step includes the step of building a chart in the memory of the data processing system, the chart representing the Boolean query, and wherein the displaying step includes displaying the plurality of tiles in accordance with the chart.

13. The method of claim 12, wherein the chart includes a data structure indicating that one of said tiles is an active tile.

14. The method of claim 12, wherein the displaying step further includes the step of maintaining a list of tiles containing an order in which the tiles were most recently manipulated, and wherein the displaying step includes displaying the tiles in accordance with the list.

15. A method for automatically accessing a database using a Boolean query, the database including a plurality of elements stored in a data processing system, including the steps, performed by the data processing system, of:

receiving a query string, the query string specifying desired elements of the database;

reformulating the query string into a plurality of terms;

displaying a plurality of graphic display tiles, each of the tiles corresponding to a different term in the plurality of terms, in a two-dimensional configuration that represents the Boolean query, wherein tiles deemed active tiles correspond to terms of a Boolean query and tiles deemed inactive do not correspond to terms of the Boolean query;

receiving information representing changes to the two-dimensional configuration of the displayed tiles;

manipulating the two-dimensional configuration of the displayed tiles to represent changes to the Boolean query; and generating a new Boolean query in the memory of the data processor to reflect the manipulated configuration.

16. The method of claim 15, further including the step of searching a data base in the memory of the data processor using the generated Boolean query.

17. The method of claim 15, wherein the receiving step includes the step of receiving a natural language query string.

18. The method of claim 17, wherein the receiving step includes the step of receiving a natural language query string that includes an explicit Boolean operator.

19. The method of claim 18, wherein the displaying step includes the step of displaying the two-dimensional configuration consisting of tiles, wherein at least one of said tiles corresponds to the explicit Boolean operator; and
 wherein a subconfiguration is a maximally sized set of contiguous columns in the displayed configuration containing no active tiles corresponding to an explicit Boolean operator which is bounded by a column containing an active tile corresponding to a Boolean operator, wherein a subquery is a Boolean query composed of terms corresponding to the active tiles of the subconfiguration, and
 wherein the generating step further includes the step of generating a new Boolean query in the memory of the data processor to reflect the manipulated configuration by combining subqueries of the manipulated configuration as arguments of the explicit Boolean operator.

20. The method of claim 17, wherein the step of reformulating the input query string further includes the step of
identifying noise words in said query string, and
wherein the displaying step further includes the step of setting the tiles corresponding to noise words as inactive.

21. The method of claim 17, wherein the step of reformulating the input query string further includes the step of reducing a term of the query string to a citation form and wherein the displaying step includes the step of displaying a tile corresponding to the citation form.

22. The method of claim 17, wherein tiles occupy columns of the configuration, and wherein two tiles are deemed to overlap if they occupy at least one of the same columns,
wherein the step of reformulating the input query string further includes the step of identifying phrases and
wherein the displaying step further includes the steps of displaying a tile corresponding to the identified phrase overlapping all tiles corresponding to words of the phrase.

23. The method of claim 22, wherein the displaying step further includes the step of deeming the tile corresponding to the phrase as active.

24. The method of claim 17, wherein tiles occupy columns of the configuration, and wherein tiles that overlap occupy at least one of the same columns, wherein the step of reformulating the input query string further includes the step of canonicalizing a complex linguistic expression including at least one term of the input query string and wherein the displaying step further includes the step of displaying a tile corresponding to the canonicalized expression overlapping all tiles corresponding to the at least one term of the input string.

25. The method of claim 24, further including the step of deeming the tile corresponding to the canonicalized expression as active.

26. The method of claim 17, wherein tiles cover columns of the configuration, and wherein tiles that overlap cover at least one of the same columns, wherein the step of reformulating the input query string further includes the step of identifying a linguistically generalized expression from at least one term of the input query string and wherein the displaying step further includes the step of displaying a tile corresponding to the generalized expression to overlap all tiles corresponding to at least one term of the input string.

27. The method of claim 26, further including the step of deeming the tile corresponding to the generalized expression as inactive.

28. The method of claim 17,
wherein the step of receiving changes information further includes the step of receiving an additional query string;
further including the steps of reformulating the additional query string into at least one new term, and displaying a tile corresponding to the new term in a next available column.

29. The method of claim 15,
wherein the displaying step further includes the step of displaying one tile in a manner indicating that the tile is deemed selected.

30. The method of claim 29, further including the steps of:
receiving information representing a new term that is more specific than the term corresponding to the selected tile;
displaying a new tile corresponding to the new term in the same column as the selected tile;
setting the selected tile as inactive; and
setting the new tile as active.

31. The method of claim 29, further including the steps of:
receiving information representing a new term that is a synonym of the term corresponding to the selected tile;
displaying a new tile corresponding to the new term in the same column as the selected tile; and
setting the new tile as active.

32. The method of claim 29, further including the steps of:
receiving information representing a new term that is conceptually related to the term corresponding to the selected tile;
displaying a new tile corresponding to the new term in a column having none of said active tiles; and
setting the new tile active.

33. The method of claim 29, further including the steps of:
receiving information representing a new term that is a superstring of the term corresponding to the selected tile;
displaying a new tile corresponding to the new term in the same column as the selected tile; and
setting the new tile as active.

34. The method of claim 15, wherein the database is a structured database composed of records which contain attributes having a value,
receiving information representing a new term that specifies a relationship between an attribute and a value;
displaying a new tile corresponding to the new term in a column of the configuration having no other ones of said tiles; and
setting the new tile as active.

35. The method of claim 34, further including the step of searching a data base in the memory of the data processor using the generated Boolean query.

36. An apparatus for graphically displaying and manipulating a Boolean query stored in a memory, the Boolean query including a plurality of terms, the apparatus comprising:
means for organizing the query as a plurality of graphic display tiles, each tile deemed an active tile corresponding to a different term in the Boolean query;
means for displaying the plurality of tiles in a two-dimensional configuration that represents the Boolean query;
means for receiving information representing changes to the two-dimensional configuration of the displayed tiles, said changes corresponding to changes in the Boolean query desired by a user;
means for manipulating the two-dimensional configuration of the displayed tiles in response to the received information to represent the corresponding changes to the Boolean query; and
means for generating a new Boolean query in the memory of the data processor to reflect the manipulated configuration.

37. An apparatus for automatically accessing a database using a Boolean query, the database including a plurality of elements, the apparatus comprising:
- means for receiving a query string, the query string specifying desired elements of the database;
- means for reformulating the query string into a plurality of terms;
- means for displaying a plurality of graphic display tiles, each of the tiles corresponding to a different term in the plurality of terms, in a two-dimensional configuration that represents the Boolean query, wherein tiles deemed active tiles correspond to terms of a Boolean query and tiles deemed inactive do not correspond to terms of the Boolean query;
- means for receiving information representing changes to the two-dimensional configuration of the displayed tiles;
- means for manipulating the two-dimensional configuration of the displayed tiles to represent changes to the Boolean query; and
- means for generating a new Boolean query in the memory of the data processor to reflect the manipulated configuration.

* * * * *